(12) United States Patent
Katoh et al.

(10) Patent No.: US 7,349,145 B2
(45) Date of Patent: Mar. 25, 2008

(54) OPTICAL DEFLECTION DEVICE AND IMAGE PROJECTION DISPLAY APPARATUS USING THE SAME

(75) Inventors: Seiichi Katoh, Miyagi-ken (JP); Takeshi Nanjyo, Hyogo-ken (JP); Koichi Ohtaka, Miyagi-ken (JP)

(73) Assignee: Ricoh Company, Ltd., Tokyo (JP)

(*) Notice: Subject to any disclaimer, the term of this patent is extended or adjusted under 35 U.S.C. 154(b) by 328 days.

(21) Appl. No.: 11/255,112

(22) Filed: Oct. 21, 2005

(65) Prior Publication Data

US 2006/0103912 A1   May 18, 2006

(30) Foreign Application Priority Data

Oct. 21, 2004   (JP) ............................. 2004-307024

(51) Int. Cl.
G02B 26/00 (2006.01)
G02B 26/08 (2006.01)
G02B 6/00 (2006.01)

(52) U.S. Cl. ................. 359/291; 359/290; 359/295; 359/298; 359/212; 359/199; 385/147

(58) Field of Classification Search ............. 359/290, 359/291, 295, 298, 198–202, 212, 214, 221, 359/254, 515, 872, 877; 362/341; 348/E9.027; 369/112.29; 438/107; 250/389, 214 LA; 385/31, 147

See application file for complete search history.

(56) References Cited

U.S. PATENT DOCUMENTS 6,900,915 B2   5/2005 Nanjyo et al. ............. 359/199
6,947,195 B2   9/2005 Ohtaka et al. ............. 359/290
7,050,217 B2*  5/2006 Nanjyo et al. ............. 359/291

(Continued)

FOREIGN PATENT DOCUMENTS

JP   05-150173   6/1993

(Continued)

OTHER PUBLICATIONS

Larry J. Hornbeck, "Deformable-Mirror Spatial Light Modulators", SPIE Critical Reviews Series vol. 1150 (1989), pp. 86-102.

(Continued)

Primary Examiner—Loha Ben
(74) Attorney, Agent, or Firm—Oblon, Spivak, McClelland, Maier & Neustadt, P.C.

(57) ABSTRACT

An optical deflection device includes a substrate; a plurality of regulating members including upper portions including stoppers; a fulcrum member serving as an electrode; a plate member; and a plurality of electrodes. The plurality of regulating members, the fulcrum member, and the plurality of electrodes are provided on the substrate, with the plate member approximately opposite to the plurality of electrodes and movable in a space formed by the substrate, the fulcrum member, and the stoppers. The plate member includes unfixed edge portions, a light reflecting region, and a conductive layer electrically connected to the fulcrum member. By fixing at least a part of the plurality of electrodes to predetermined potentials and changing a potential of the fulcrum member, the plate member is displaced around the fulcrum member by electrostatic attraction force, and a light incident in the light reflecting region in a direction is deflected and reflected in another direction.

29 Claims, 19 Drawing Sheets

FIRST AXIAL DEFLECTION

SECOND AXIAL DEFLECTION

U.S. PATENT DOCUMENTS

| | | | |
|---|---|---|---|
| 7,113,321 B2 * | 9/2006 | Nanjyo et al. | 359/290 |
| 7,167,290 B2 * | 1/2007 | Katoh et al. | 359/212 |
| 2004/0012667 A1 | 1/2004 | Ohtaka et al. | 347/233 |
| 2004/0263936 A1 | 12/2004 | Nanjyo et al. | 359/212 |
| 2004/0263945 A1 | 12/2004 | Nanjyo et al. | 359/291 |
| 2005/0169156 A1 * | 8/2005 | Katoh et al. | 369/112.29 |
| 2005/0248862 A1 * | 11/2005 | Nanjo et al. | 359/872 |
| 2006/0103912 A1 | 5/2006 | Katoh et al. | |
| 2006/0104597 A1 * | 5/2006 | Nanjo et al. | 385/147 |

FOREIGN PATENT DOCUMENTS

| | | |
|---|---|---|
| JP | 2004-078136 | 3/2004 |
| JP | 2004-138881 | 5/2004 |
| JP | 2005-195798 | 7/2005 |

OTHER PUBLICATIONS

Peter F. Van Kessel et al., "A MEMS-Based Projection Display", IEEE vol. 86, No. 8 (1998), pp. 1687-1704.

U.S. Appl. No. 11/411,849, filed Apr. 27, 2006, Nanjyo et al.

U.S. Appl. No. 11/681,021, filed Mar. 1, 2007, Katoh et al.

U.S. Appl. No. 11/582,995, filed Oct. 19, 2006, Katoh et al.

U.S. Appl. No. 11/776,305, filed Jul. 11, 2007, Nanjyo et al.

U.S. Appl. No. 11/406,372, filed Apr. 19, 2006, Nanjyo et al.

* cited by examiner

FIRST AXIAL DEFLECTION

SECOND AXIAL DEFLECTION

FIRST AXIAL DEFLECTION

SECOND AXIAL DEFLECTION

FIST AXIS ON
θ DIRECTION

FIST AXIS OFF
−θ DIRECTION

SECOND AXIS ON
φ DIRECTION

SECOND AXIS OFF
−φ DIRECTION

| | ELECTRODE a | ELECTRODE b | ELECTRODE c | ELECTRODE d | FULCRUM 106 |
|---|---|---|---|---|---|
| DEFLECT IN DIRECTION D1 | x | x | 0 | 0 | 0 |
| DEFLECT IN DIRECTION D2 | x | x | 0 | 0 | x |
| DEFLECT IN DIRECTION D3 | x | 0 | x | 0 | x |
| DEFLECT IN DIRECTION D4 | x | 0 | x | 0 | 0 |

UNIT: V

OPTICAL DEFLECTION DEVICE AND IMAGE PROJECTION DISPLAY APPARATUS USING THE SAME

CROSS REFERENCE TO RELATED APPLICATION

This application claims priority to Japanese patent application no. 2004-307024 filed on Oct. 21, 2004, the disclosure of which is hereby incorporated by reference herein in its entirety.

BACKGROUND OF THE INVENTION

1. Field of the Invention

The present invention relates to an optical deflection device and an image projection display apparatus using the optical deflection device, and more particularly to an optical deflection device and an image projection display apparatus capable of performing an optical deflection operation in four directions along two axes.

2. Discussion of the Background Arts

A digital micro-mirror device including a torsion bar hinge has been proposed by L. J. Hornbeck. The digital micro-mirror device is developed into a spatial light modulator which includes a group of micro mirrors. The spatial light modulator is referred to as a DMD (digital micromirror device) and is used in image projection display apparatuses, for example.

In this type of background device, a mirror is usually supported by a torsion bar (i.e., a hinge). The mirror is driven by changing an electrical potential (hereinafter referred to as potential) of the mirror. A larger deflection angle can be obtained in a bi-directional operation of the mirror than in a mono-stable operation. To obtain bi-stability, a hinge of relative high stiffness is used for the mirror in the background device. In driving the mirror, therefore, the potential of the mirror and potentials of electrodes opposite to the mirror are simultaneously changed.

A device such as a spatial light modulator and an optical deflection device using a hinge has relatively high resilience due to its stiffness, and thus a driving voltage for driving the device increases up to several tens of voltages. If the stiffness is reduced to decrease the driving voltage, however, the hinge is bent and a center location of a mirror may not be maintained. To perform the bi-stable operation, therefore, a relatively complicated mechanism is necessary. For example, a tilt of the mirror is changed by changing a first potential of the mirror and the potentials of the electrodes. Further, a light is deflected only in one axial direction in the device. Accordingly, a color selecting device, such as a color wheel, may be needed.

SUMMARY OF THE INVENTION

This patent specification describes a novel optical deflection device. In one aspect, a novel optical deflection device includes a substrate, a plurality of regulating members, a fulcrum member, a plate member, and a plurality of electrodes. The plurality of regulating members are respectively provided at a plurality of edge portions on an upper surface of the substrate, and respectively include upper portions including stoppers. The fulcrum member is provided on the upper surface of the substrate, and includes a top portion serving as an electrode configured to establish a potential thereof. The plate member is movably placed in a space formed by the substrate, the fulcrum member, and the stoppers. The plate member includes unfixed edge portions, a light reflecting region forming an upper surface of the plate member, and a conductive layer electrically connected to the fulcrum member. The plurality of electrodes are provided on the upper surface of the substrate to be approximately opposite to the conductive layer of the plate member and to surround the fulcrum member. When at least a part of the plurality of electrodes are fixed to predetermined potentials and a potential of the fulcrum member is changed, the plate member tilts and displaces around the fulcrum member due to electrostatic attraction force, and a light incident in the light reflecting region in a first direction is deflected and reflected in a second direction different from the first direction.

This patent specification further describes a novel optical deflection array. In one aspect, a novel optical deflection array includes a plurality of optical deflection devices placed in either one of a one-dimensional array or a two-dimensional array. Each of the plurality of optical deflection devices includes a substrate, a plurality of regulating members, a fulcrum member, a plate member, and a plurality of electrodes. The plurality of regulating members are respectively provided at a plurality of edge portions on an upper surface of the substrate, and respectively include upper portions including stoppers. The fulcrum member is provided on the upper surface of the substrate, and includes a top portion serving as an electrode configured to establish a potential thereof. The plate member is movably placed in a space formed by the substrate, the fulcrum member, and the stoppers. The plate member includes unfixed edge portions, a light reflecting region forming an upper surface of the plate member, and a conductive layer electrically connected to the fulcrum member. The plurality of electrodes are provided on the upper surface of the substrate to be approximately opposite to the conductive layer of the plate member and to surround the fulcrum member. When at least a part of the plurality of electrodes are fixed to predetermined potentials and a potential of the fulcrum member is changed, the plate member tilts and displaces around the fulcrum member due to electrostatic attraction force, and a light incident in the light reflecting region in a first direction is deflected and reflected in a second direction different from the first direction.

This patent specification further describes a novel optical system. In one aspect, a novel optical system includes an optical deflection array, at least one light source for applying a light to the optical deflection array, and a projection lens for projecting the light reflected by the optical deflection array according to color data. The optical deflection array includes a plurality of optical deflection devices placed in either one of a one-dimensional array or a two-dimensional array. Each of the plurality of optical deflection devices includes a substrate, a plurality of regulating members, a fulcrum member, a plate member, and a plurality of electrodes. The plurality of regulating members are respectively provided at a plurality of edge portions on an upper surface of the substrate, and respectively include upper portions including stoppers. The fulcrum member is provided on the upper surface of the substrate, and includes a top portion serving as an electrode configured to establish a potential thereof. The plate member is movably placed in a space formed by the substrate, the fulcrum member, and the stoppers. The plate member includes unfixed edge portions, a light reflecting region forming an upper surface of the plate member, and a conductive layer electrically connected to the fulcrum member. The plurality of electrodes are provided on the upper surface of the substrate to be approximately opposite to the conductive layer of the plate member and to surround the fulcrum member. When at least a part of the plurality of electrodes are fixed to predetermined potentials and a potential of the fulcrum member is changed, the plate member tilts and displaces around the fulcrum member due to electrostatic attraction force, and a light incident in the light reflecting region in a first direction is deflected and reflected in a second direction different from the first direction.

This patent specification further describes a novel image projection display apparatus. In one aspect, a novel image projection display apparatus includes a screen, and an optical system for projecting an image onto the screen. The optical system includes an optical deflection array, at least one light source for applying a light to the optical deflection array, and a projection lens for projecting the light reflected by the optical deflection array according to color data. The optical deflection array includes a plurality of optical deflection devices placed in either one of a one-dimensional array or a two-dimensional array. Each of the plurality of optical deflection devices includes a substrate, a plurality of regulating members, a fulcrum member, a plate member, and a plurality of electrodes. The plurality of regulating members are respectively provided at a plurality of edge portions on an upper surface of the substrate, and respectively include upper portions including stoppers. The fulcrum member is provided on the upper surface of the substrate, and includes a top portion serving as an electrode configured to establish a potential thereof. The plate member is movably placed in a space formed by the substrate, the fulcrum member, and the stoppers. The plate member includes unfixed edge portions, a light reflecting region forming an upper surface of the plate member, and a conductive layer electrically connected to the fulcrum member. The plurality of electrodes are provided on the upper surface of the substrate to be approximately opposite to the conductive layer of the plate member and to surround the fulcrum member. When at least a part of the plurality of electrodes are fixed to predetermined potentials and a potential of the fulcrum member is changed, the plate member tilts and displaces around the fulcrum member due to electrostatic attraction force, and a light incident in the light reflecting region in a first direction is deflected and reflected in a second direction different from the first direction.

BRIEF DESCRIPTION OF THE DRAWINGS

A more complete appreciation of the invention and many of the advantages thereof are obtained as the same becomes better understood by reference to the following detailed description when considered in connection with the accompanying drawings, wherein.

DETAILED DESCRIPTION OF THE PREFERRED EMBODIMENTS

Figure 1:
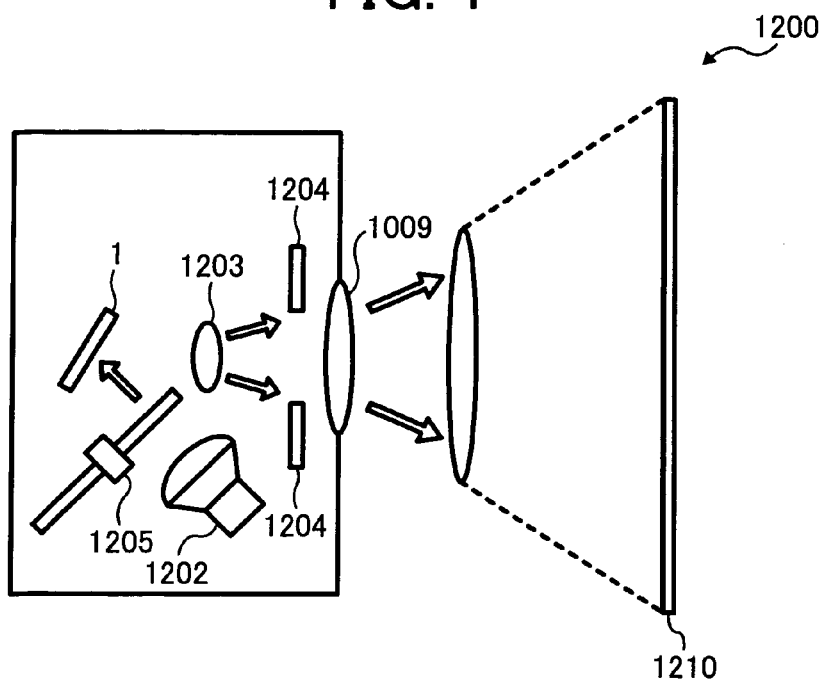
FIG. 1 is a diagram illustrating an image projection display apparatus according to an embodiment of the present invention.

In describing the embodiments illustrated in the drawings, specific terminology is employed for the purpose of clarity. However, the disclosure of this patent specification is not intended to be limited to the specific terminology so used, and it is to be understood that substitutions for each specific element can include any technical equivalents that operate in a similar manner.

Referring now to the drawings, wherein like reference numerals designate identical or corresponding parts throughout the several views, particularly to FIG. 1, a configuration and operation of an image projection display apparatus 1200 according to an embodiment of the present invention are described.

The image projection display apparatus 1200 illustrated in FIG. 1 includes an optical deflection device 1, a light source 1202, a projection lens 1203, a light-intercepting member 1204, a rotary color filter 1205, a projection lens 1009, and a projection screen 1210. The optical deflection device 1 illustrated in FIG. 1 indicates one of a plurality of the optical deflection devices 1 placed in a two-dimensional array, for example.

In the image projection display apparatus 1200, a light emitted from the light source 1202 and having a certain divergence angle is applied to the optical deflection device 1 through the rotary color filter 1205. The optical deflection device 1 has a plate member, an upper surface of which includes a light reflecting region (later described). When the plate member is tilted in a first tilting direction, the light reflected by the light reflecting region of the plate member is applied to the projection screen 1210 (i.e., ON-reflection). If the plate member 107 is tilted in a second tilting direction, however, the light reflected by the light reflecting region of the plate member is received by the light-intercepting member 1204, which function as an aperture. Thus, the reflected light is not projected onto the projection screen 1210 (i.e., OFF-reflection). An image is projected to the projection screen 1210 through control of the ON-reflection and the OFF-reflection. In this way, the optical deflection device 1 is used as an optical switch for the image projection display apparatus 1200 which displays image projection data (i.e., tones of pixels). According to the image projection display apparatus 1200, therefore, control of the tones of pixels (i.e., ON/OFF control of the optical switch) is well performed, and stray lights emitted and reflected in wrong directions from adjacent optical deflection devices are reduced. Further, the image projection display apparatus 1200 is operable at an increased speed with a relatively low voltage over a relatively long time, and provides an enhanced contrast ratio.

Figure 2:
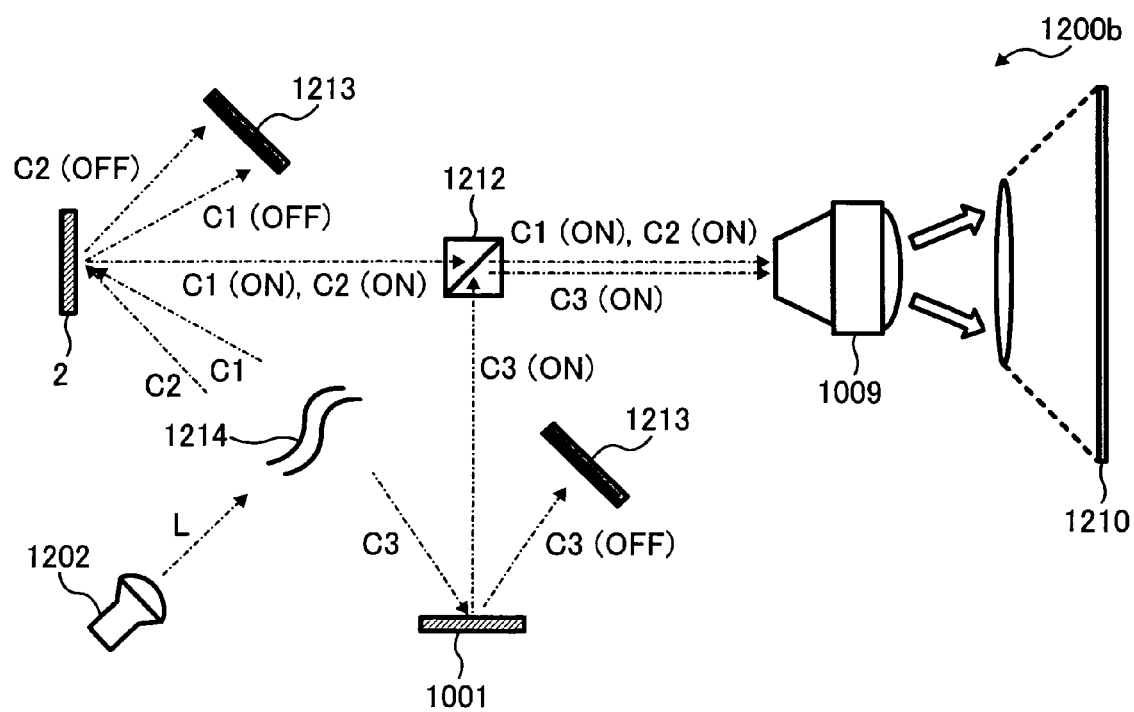
FIG. 2 is a diagram illustrating an image projection display apparatus according to another embodiment of the present invention.

FIG. 2 illustrates a configuration of an image projection display apparatus 1200b according to another embodiment of the present invention. The image projection display apparatus 1200b includes the optical deflection device 1 which performs the optical deflection operation in one axial direction and another optical deflection device 2 which performs the optical deflection operation in two axial directions. Similar to the optical deflection device 1, the optical deflection device 2 illustrated in FIG. 2 indicates one of a plurality of the optical deflection devices 2 placed in a two-dimensional array, for example. As well as the optical deflection devices 1 and 2, the image projection display apparatus 1200b includes the light source 1202, a lens-mirror system 1214, light-absorbing plates 1213, the projection screen 1210, the projection lens 1009, and a color composition prism 1212.

The lens-mirror system 1214 (indicated by wave lines in FIG. 2 for simplification) includes a plurality of optical mirrors and lenses. The lens-mirror system 1214 applies the light L emitted from the light source 1202 to the optical deflection devices 1 and 2 as incident light fluxes C1, C2, and C3. The incident light fluxes C1, C2, and C3 are of different colors from one another (i.e., the three primary colors red, green, and blue). Alternatively, the incident light fluxes C1, C2, and C3 may be other colors different from the three primary colors having different wavelengths.

As described later with reference to FIGS. 9A, 9B and 10A, 10B, angles of the incident light fluxes C1 and C2 are set such that the incident light fluxes C1 and C2 are reflected, as reflected light fluxes C1(ON) and C2(ON), from the tilted plate member of the optical deflection device 2 in a direction perpendicular to a substrate of the optical deflection device 2. Similarly, an angle of the incident light flux C3 is set such that the incident light flux C3 is reflected, as a reflected light flux C3(ON), from the tilted plate member of the optical deflection device 1 in a direction perpendicular to the substrate of the optical deflection device 1. Particularly, the angles of the incident light fluxes C1 and C2 are set to be different from each other by ninety degrees with respect to a surface of the substrate of the optical deflection device 2.

As described above, C1(ON), C2(ON), and C3(ON) are the reflected light fluxes guided to the projection lens 1009 in the ON-reflection. The reflected light fluxes C1(ON), C2(ON), and C3(ON) are referred to here as ON-lights. Meanwhile, C1(OFF), C2(OFF), and C3(OFF) are reflected light fluxes not guided to the projection lens 1009 but received by the light-absorbing plates 1213 in the OFF-reflection. The reflected light fluxes C1(OFF), C2(OFF), and C3(OFF) are referred to here as OFF-lights.

Each of the incident light fluxes C1, C2, and C3 indicated by an arrow in FIG. 2 is a light ray having a certain width. The incident light fluxes C1 and C2 are applied to an entire surface of the optical deflection array including the plurality of the optical deflection devices 2, while the incident light flux C3 is applied to an entire surface of the optical deflection array including the plurality of the optical deflection devices 1. In the present example, the light source 1202 is a white light source, such as a xenon lamp, a halogen lamp, or a mercury lamp, for example. The lens-mirror system 1214 includes, for example, an IR (infrared ray) cut mirror or an IR cut filter for filtering out infrared rays, an integrator lens or a rod lens for transforming the light L emitted from the light source 1202 into a parallel light, a dichroic mirror or a dichroic prism for separating the light L emitted from the light source 1202 into lights of target colors, or a total reflecting mirror or a TIR (total internal reflection) prism for shifting directions of the lights of the respective colors applied to the optical deflection arrays. A primary function of the lens-mirror system 1214 is to separate the light L emitted from the light source 1202 into the light fluxes C1 and C2 of the different colors and to apply the light fluxes C1 and C2 to the optical deflection array in different directions by using the above-described optical mirrors and lenses in combination.

The reflected light fluxes of the three different colors C1(ON), C2(ON), and C3(ON) are subjected to color composition by the color composition prism 1212, so that different three-color compositions are performed. As a result, a high-definition image is displayed on the projection screen 1210.

When an optical deflection device having a single plate member and performing the optical deflection in one axial direction is used in an image projection display apparatus (e.g., projector), time for switching the optical deflection device is time-divisionally allocated for each color by using a color wheel, for example. In this case, however, deterioration in colors called "color break" may be observed in a fast-moving image.

In the image projection display apparatus 1200b according to the present embodiment, on the other hand, the single optical deflection array 2 deflects two different lights in the two axial directions. Further, color switching can be performed in the entirety, a half region, a fourth region, a row, or a pixel of the optical deflection array 2, for example. As a result, colors are appropriately mixed, and occurrences of the color break are substantially reduced.

Figure 3A:
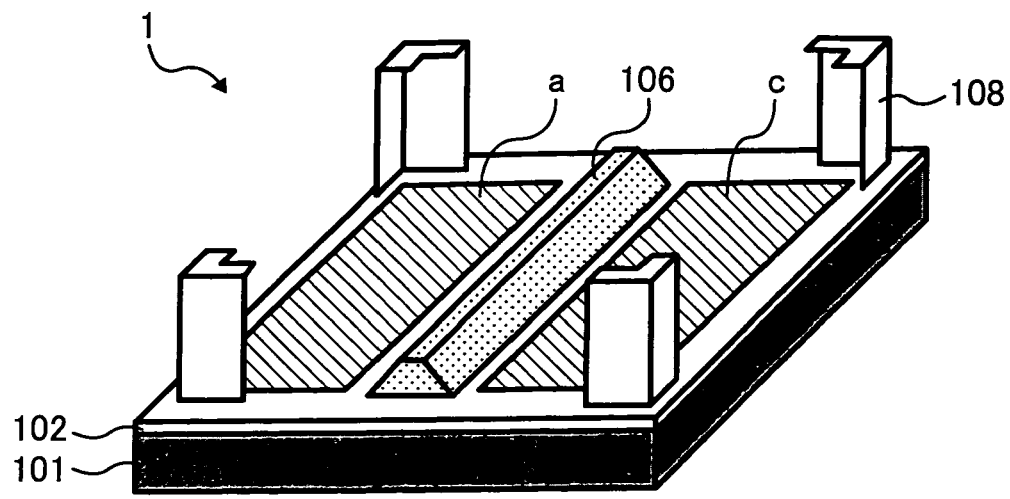
FIG. 3A is a perspective view of an optical deflection device according to an embodiment of the present invention, in which a plate member is removed.
Figure 3B:
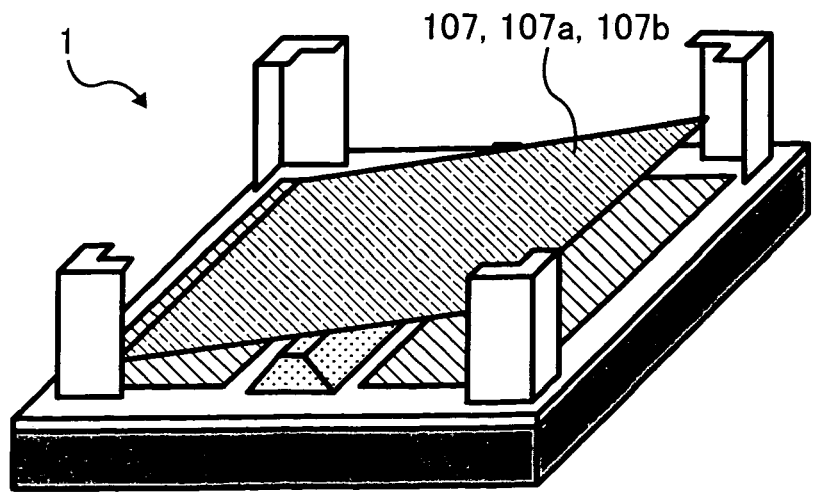
FIG. 3B is a perspective view of the optical deflection device illustrated in FIG. 3A, in which the plate member is provided.

With reference to FIGS. 3A and 3B, a configuration and operations of the optical deflection device 1 according to an embodiment of the present invention are described. The optical deflection device 1 includes a substrate 101, an insulating film 102, a plurality of electrodes a and c, a fulcrum electrode 106, a plate member 107, and a plurality of regulating members 108. Each of the electrodes a and c is covered by an insulating film (not illustrated). The plate member 107 includes and a light reflecting region 107a and a conductive layer 107b. The light reflecting region 107a forms an upper surface of the plate member 107.

In the optical deflection device 1, the electrodes a and c are placed on the substrate 101 via the insulating film 102. The plate member 107 is placed on the fulcrum electrode 106, as illustrated in FIG. 3B. A conductor is exposed at a top portion of the fulcrum electrode 106 so that the conductor is electrically connected to the conductive layer 107b of the plate member 107. Thus configured, the fulcrum electrode 106 can provide a potential to the conductive layer 107b of the plate member 107.

The plate member 107 is configured to revolve (i.e., tilt) to some extent. Movement of the plate member 107 is, however, regulated by the plurality of regulating members 108 so as not to be displaced from the optical deflection device 1. When the plate member 107 tilts with respect to the substrate 101, the plate member 107, the fulcrum member 106, and the substrate 101 form a triangle. A tilt angle α (alpha) of the plate member 107 with respect to the substrate 101 is expressed as $\alpha = \arcsin\{H/(L/2)\}$, wherein H is a height of the fulcrum member 106, and L is a side length of the plate member 107.

When electrostatic force working between the plate member 107 and the electrode a is unequal to electrostatic force working between the plate member 107 and the electrode c, the plate member 107 revolves and tilts toward either one of the electrodes a and c. When the conductive layer 107b of the plate member 107 temporarily separates from the fulcrum electrode 106, which is placed on the substrate 101 and is in contact with the plate member 107, the conductive layer 107b retains electric charge, and thus the electrostatic force is maintained. That is, the electrostatic force is not lost upon separation of the conductive layer 107b from the fulcrum electrode 106. The plate member 107 can contact the fulcrum electrode 106 again due to the electrostatic force.

Figure 4:
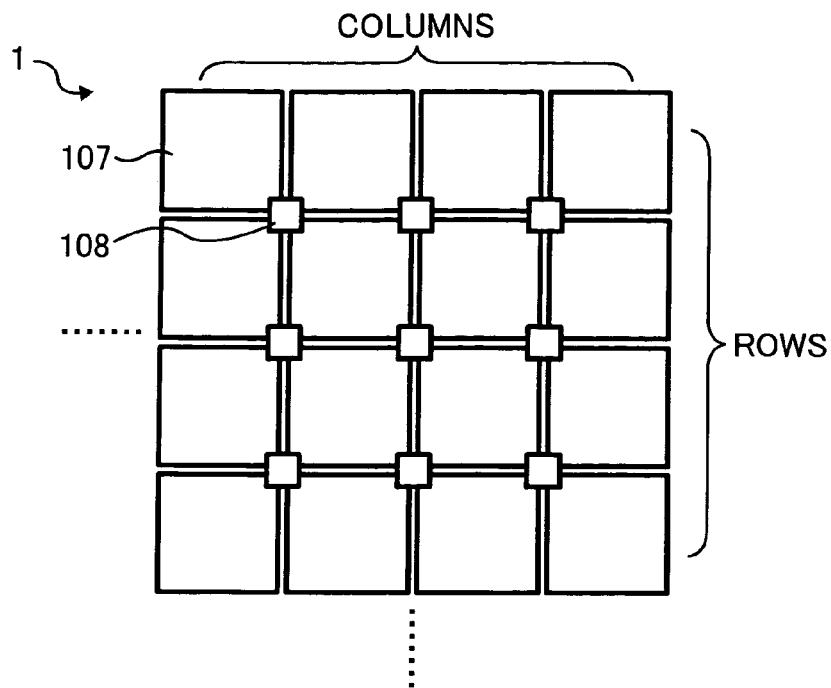
FIG. 4 is a diagram illustrating a plurality of the optical deflection devices illustrated in FIGS. 3A and 3B, as arranged in a two-dimensional array.

As illustrated in FIG. 4, a plurality of the optical deflection devices 1 can be arranged in a two-dimensional array, which is used as a light valve of an image projection display apparatus such as a projector, for example.

The optical deflection device 1 may be manufactured through a semiconductor manufacturing process. Preferably, a group of driving active elements are provided in a first layer on a substrate, and a plurality of electrodes and a plate member are placed in a second layer above the first layer. Alternatively, a substrate on which the group of driving active elements are formed may be bonded together with a substrate on which the plurality of electrodes and the plate member are formed.

Operations of the optical deflection device 1 are described with reference to FIGS. 5A and 5B. An arbitrary potential is applied to each of the electrodes a and c. For example, two different potentials V1 and V2 are applied to the electrodes a and c, respectively. Further, the fulcrum electrode 106 electrically connected to the plate member 107 is applied with a predetermined potential (e.g., V1 or V2). As a result, the tilt direction of the plate member 107 is changed.

Figure 5A:
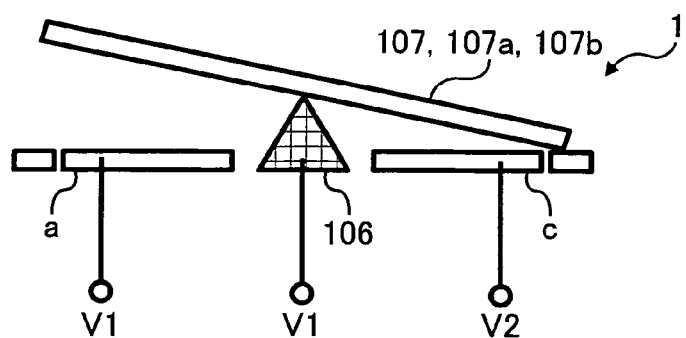
FIG. 5A is a diagram illustrating an operation of the optical deflection device illustrated in FIGS. 3A and 3B.

For example, the fulcrum electrode 106 is applied with the potential V1, as illustrated in FIG. 5A. Since the potential of the electrode a is V1 and the potential of the electrode c is V2, the conductive layer 107b of the plate member 107 and the electrode a are equal in potential. Thus, the electrostatic force does not work between the conductive layer 107b of the plate member 107 and the electrode a. Meanwhile, there is a difference in potential (i.e., V2-V1) between the conductive layer 107b of the plate member 107 and the electrode c. Thus, the electrostatic force works between the conductive layer 107b of the plate member 107 and the electrode c. Accordingly, the plate member 107 is drawn and tilts toward the electrode c.

Figure 5B:
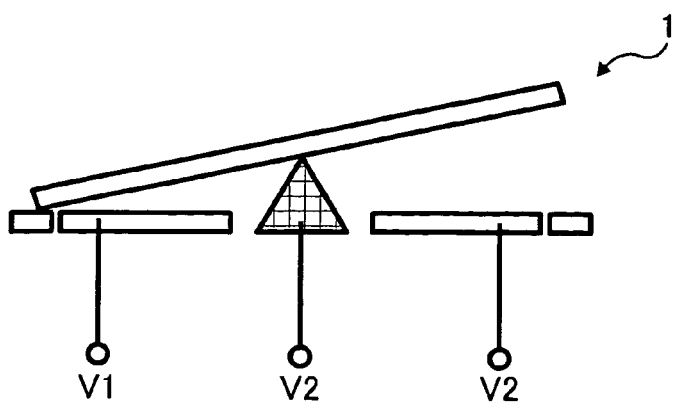
FIG. 5B is a diagram illustrating another operation of the optical deflection device illustrated in FIGS. 3A and 3B.

On the other hand, the fulcrum electrode 106 is applied with the potential V2 in FIG. 5B. Since the potential of the electrode a is V1 and the potential of the electrode c is V2, the conductive layer 107b of the plate member 107 and the electrode c are equal in potential. Thus, the electrostatic force does not work between the conductive layer 107b of the plate member 107 and the electrode c. Meanwhile, there is a difference in potential (i.e., V2-V1) between the conductive layer 107b of the plate member 107 and the electrode a. Thus, the electrostatic force works between the conductive layer 107b of the plate member 107 and the electrode a. Accordingly, the plate member 107 is drawn and tilts toward the electrode a.

Alternatively, the electrode a (referred to as first electrode group) and the electrode c (referred to as second electrode group) are applied with the potentials V1 and V2, respectively, and the fulcrum electrode 106 electrically connected to the conductive layer 107b of the plate member 107 is applied with a potential V3 such that an electrostatic moment (i.e., torque) is greater between the second electrode group and the conductive layer 107b of the plate member 107 than between the first electrode group and the conductive layer 107b of the plate member 107. Accordingly, the plate member 107 tilts toward the second electrode. Conversely, the fulcrum electrode 106 electrically connected to the conductive layer 107b of the plate member 107 may be applied with a potential V4 such that the electrostatic moment is greater between the first electrode group and the conductive layer 107b of the plate member 107 than between the second electrode group and the conductive layer 107b of the plate member 107. Accordingly, the plate member 107 tilts toward the first electrode group. In the above description, the first and second electrode groups are two groups of electrodes divided with respect to the fulcrum member 106.

The above potentials are represented as V1<V3<V4<V2. If V1 is 0 volt and V2 is 10 volts, for example, and if the potential applied to the fulcrum electrode 106 is 0 volt, the conductive layer 107b of the plate member 107 and the first electrode group are equal in potential. Thus, the electrostatic force does not work between the conductive layer 107b of the plate member 107 and the first electrode group. Meanwhile, there is a potential difference of 10 volts between the conductive layer 107b of the plate member 107 and the second electrode group, and thus the electrostatic force works between the conductive layer 107b of the plate member 107 and the second electrode group. Accordingly, the plate member 107 tilts toward the first electrode.

If the potential of the conductive layer 107b of the plate member 107 is 0.1 volts, for example, there is a potential difference of 0.1 volts between the conductive layer 107b of the plate member 107 and the first electrode group, while there is a potential difference of 9.9 volts between the conductive layer 107b of the plate member 107 and the second electrode group. That is, an electrostatic moment generated by the potential difference of 9.9 volts between the conductive layer 107b of the plate member 107 and the second electrode group is greater than an electrostatic moment generated by the potential difference of 0.1 volts between the conductive layer 107b of the plate member 107 and the first electrode group. Accordingly, the plate member 107 tilts toward the second electrode.

In this way, the tilt of the plate member 107 can be changed, even when the potential of the fulcrum electrode 106 electrically connected to the conductive layer 107b of the plate member 107 is not equal to either one of the potential V1 applied to the first electrode group and the potential V2 applied to the second electrode group. That is, the tilt of the plate member 107 can be changed by applying the fulcrum electrode 106 with such potential that makes one of the two electrostatic moments greater than the other.

Figure 6A:
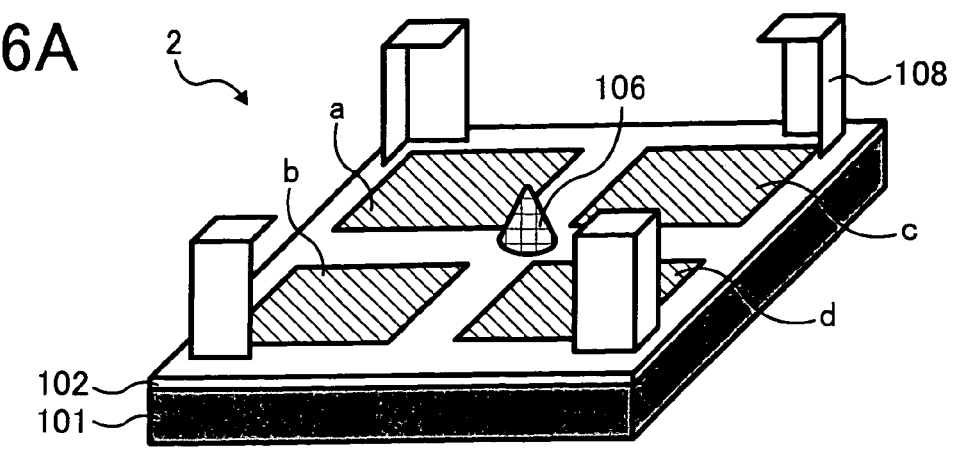
FIG. 6A is a perspective view of an optical deflection device according to another embodiment of the present invention, in which a plate member is removed.
Figure 6B:
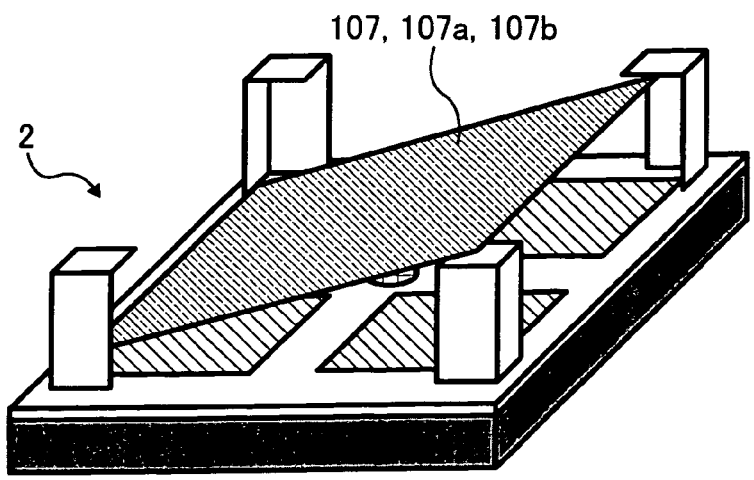
FIG. 6B is a perspective view of the optical deflection device illustrated in FIG. 6A, in which the plate member tilts in an axial direction.
Figure 6C:
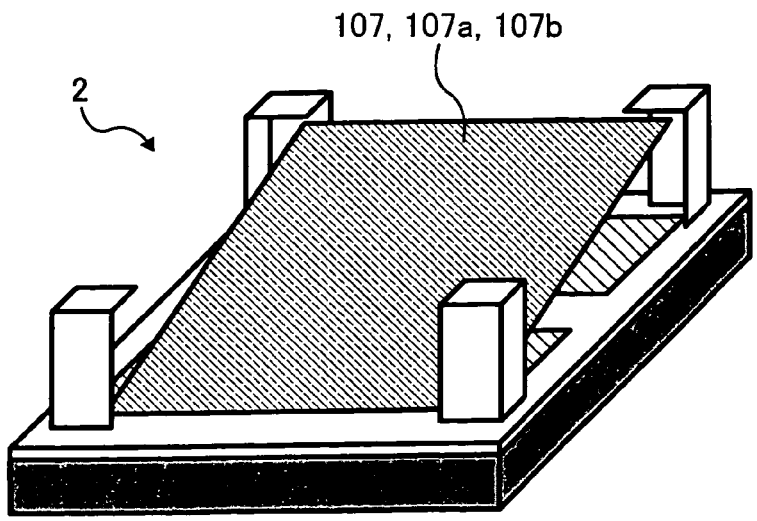
FIG. 6C is a perspective view of the optical deflection device illustrated in FIG. 6A, in which the plate member tilts in another axial direction.

With reference to FIGS. 6A to 6C, the optical deflection device 2 according to another embodiment of the present invention is described. In the optical deflection device 2 illustrated in FIGS. 6A to 6C, two axial movements are observed. That is, the plate member 107 is tilted in either one of a first axial direction and a second axial direction.

The optical deflection device 2 includes electrodes b and d, as well as the members included in the optical deflection device 1. Each of the electrodes b and d is covered by an insulating film (not illustrated), similarly to the electrodes a and c of the optical deflection device 1. Description is omitted for the members of the optical deflection device 2 which are also included in the optical deflection device 1, and differences between the optical deflection device 1 and the optical deflection device 2 are described.

Figure 7A:
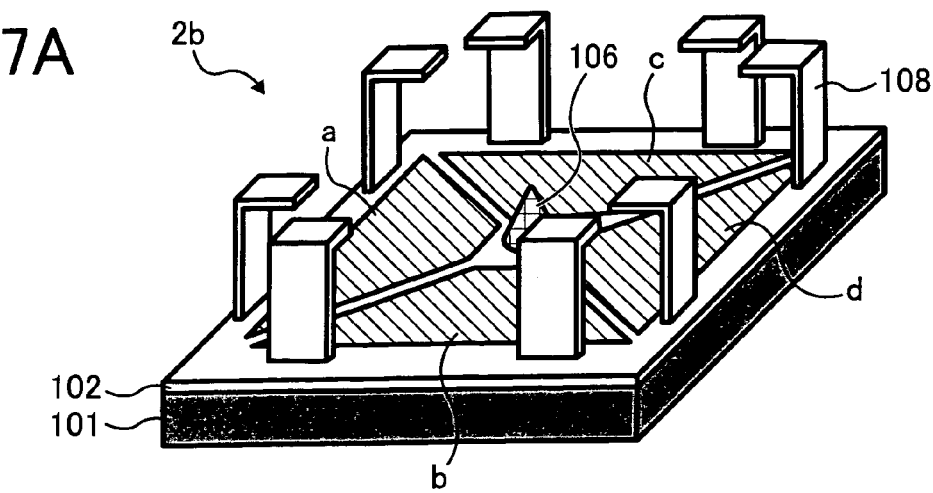
FIG. 7A is a perspective view of an optical deflection device according to another embodiment of the present invention, in which a plate member is removed.
Figure 7B:
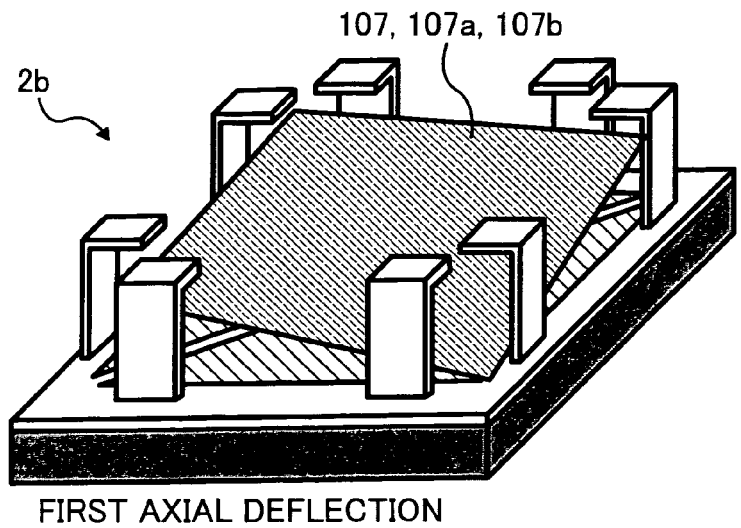
FIG. 7B is a perspective view of the optical deflection device illustrated in FIG. 7A, in which the plate member tilts in an axial direction.
Figure 7C:
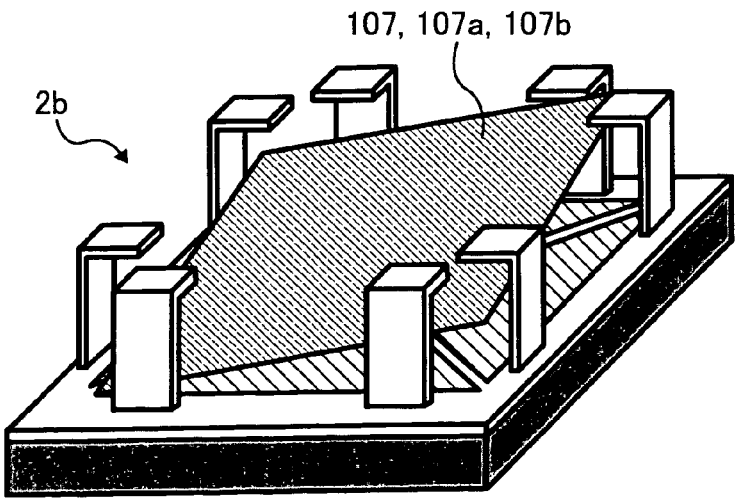
FIG. 7C is a perspective view of the optical deflection device illustrated in FIG. 7A, in which the plate member tilts in another axial direction.

In the optical deflection device 2, the electrodes a to d face the plate member 107. The fulcrum electrode 106 is electrically connected to the conductive layer 107b of the plate member 107 or independently establishes its own potential. Shapes and arrangements of the electrodes a to d, the fulcrum electrode 106, and the regulating members 108, and displacement operations of the plate member 107 are not limited to the example illustrated in FIGS. 6A to 6C but also include an example illustrated in FIGS. 7A to 7C, as another example.

A movement of the optical deflection device 2 illustrated in FIG. 6B in which the plate member 107 tilts towards either the electrodes a and b or the electrodes c and d is referred to as a first axial displacement. Meanwhile, a movement of the optical deflection device 2 illustrated in FIG. 6C in which the plate member 107 tilts towards either the electrodes a and c or the electrodes b and d is referred to as a second axial displacement. A direction of the first axial displacement is different from a direction of the second axial displacement by approximately ninety degrees.

With reference to FIGS. 8A to 8D, operations of the optical deflection device 2 are described. The electrodes a to d of the optical deflection device 2 are divided into the two electrode groups. In FIGS. 8A to 8D, for example, the electrodes b and c are included in the first electrode group and indicated by bold lines. Meanwhile, the electrodes a and d are included in the second electrode group. The electrodes b and c included in the first electrode group are applied with and fixed to different arbitrary potentials, respectively. For example, the electrode b is fixed to the potential V1, while the electrode c is fixed to the potential V2.

Figure 8A:
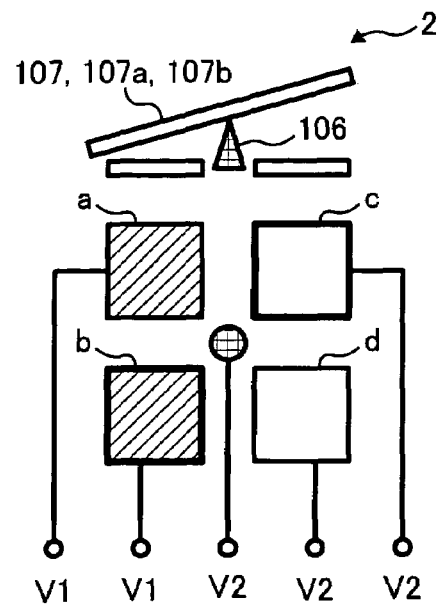
FIG. 8A is a diagram illustrating an operation of the optical deflection device illustrated in FIGS. 6A to 6C.

In FIG. 8A, the potentials of the electrodes a and d are set to V1 and V2, respectively. Further, the potential of the fulcrum electrode 106 electrically connected to the conductive layer 107b of the plate member 107 is set to V2. With this configuration, according to the principle described above with reference to FIGS. 5A and 5B, the plate member 107 tilts towards the electrodes a and b (i.e., the first axial displacement).

Figure 8B:
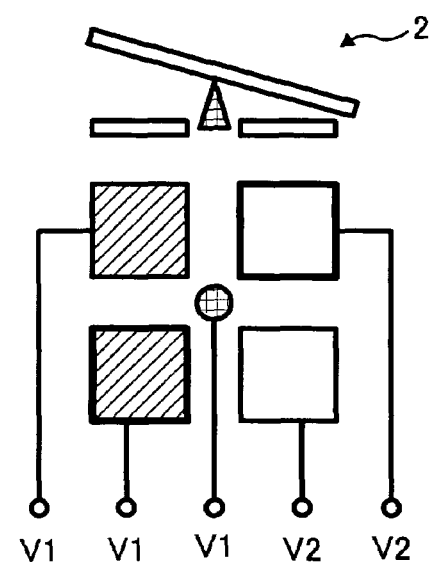
FIG. 8B is a diagram illustrating another operation of the optical deflection device illustrated in FIGS. 6A to 6C.

In FIG. 8B, the potentials of the electrodes a and d are set to V1 and V2, respectively. Further, the potential of the fulcrum electrode 106 electrically connected to the conductive layer 107b of the plate member 107 is set to V1. As a result, according to the principle described above with reference to FIGS. 5A and 5B, the plate member 107 tilts towards the electrodes c and d (i.e., the first axial displacement).

Figure 8C:
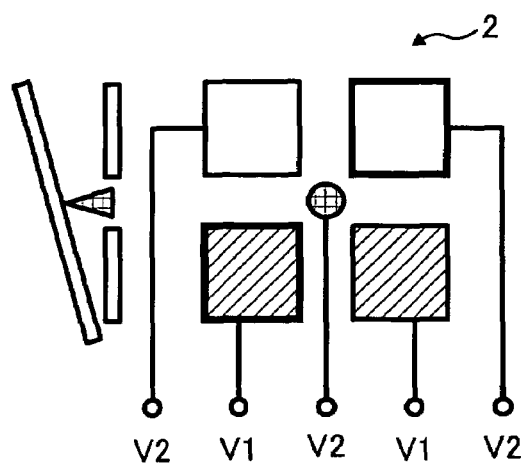
FIG. 8C is a diagram illustrating another operation of the optical deflection device illustrated in FIGS. 6A to 6C.

In FIG. 8C, the potentials of the electrodes a and d are set to V2 and V1, respectively. Further, the potential of the fulcrum electrode 106 electrically connected to the conductive layer 107b of the plate member 107 is set to V2. As a result, according to the principle described above with reference to FIGS. 5A and 5B, the plate member 107 tilts towards the electrodes b and d (i.e., the second axial displacement).

Figure 8D:
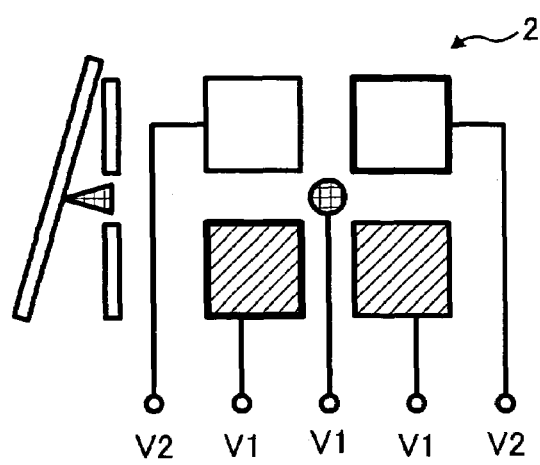
FIG. 8D is a diagram illustrating another operation of the optical deflection device illustrated in FIGS. 6A to 6C.

In FIG. 8D, the potentials of the electrodes a and d are set to V2 and V1, respectively. Further, the potential of the fulcrum electrode 106 electrically connected to the conductive layer 107b of the plate member 107 is set to V1. As a result, according to the principle described above with reference to FIGS. 5A and 5B, the plate member 107 tilts towards the electrodes a and c (i.e., the second axial displacement).

The potentials applied to the electrodes a and d and the fulcrum electrode 106 are not limited to V1 and V2, but may be any potentials which cause a difference in the electrostatic moments affecting the plate member 107. The electrodes may be fixed to the predetermined potentials for a time period in which the plate member 107 in a tilting displacement moves to a desired tilting displacement. Even if the conductive layer 107b of the plate member 107 temporarily separates from the fulcrum electrode 106, which is provided on the substrate 101 and is electrically connected to the conductive layer 107b of the plate member 107, the conductive layer 107b of the plate member 107 can retain electric charge. Thus, the electrostatic force is maintained, i.e., the electrostatic force is not lost upon separation of the plate member 107 from the fulcrum electrode 106. The plate member 107 can contact the fulcrum electrode 106 again due to the electrostatic force.

In this way, the potential of the fulcrum electrode 106 electrically connected to the conductive layer 107b of the plate member, i.e., the potential of the conductive layer 107b of the plate member 107, is switched between two levels. Thus, the direction of the revolving movement of the plate member 107 on the top portion of the fulcrum electrode 106 and the tilt of the plate member 107 can be changed. Accordingly, an incident light can be deflected by the light reflecting region 107a of the plate member 107.

With reference to FIGS. 9A, 9B and 10A, 10B, optical deflection operations of the optical deflection device 2 in two axial directions are described.

A tilting displacement angle of a first axis of the plate member 107 with respect to the substrate 101 and a tilting displacement angle of a second axis of the plate member 107 with respect to the substrate 101 are indicated as $\theta$ (theta) and $\phi$ (phi), respectively. First and second incident lights La and Lc are input from two different points. The first and second incident lights La and Lc are then deflected by the optical deflection device 2 as first and second reflected lights Lb and Ld, respectively. There are four different optical deflection patterns, as illustrated in FIGS. 9A, 9B and 10A, 10B.

In the ON-reflection, an incident light received by the substrate 101 (i.e., the plate member 107) is reflected in a direction perpendicular to the substrate 101. Meanwhile, in the OFF-reflection, the incident light received by the substrate 101 (i.e., the plate member 107) is reflected in a direction not perpendicular to the substrate 101. That is, the incident light is intercepted. It is now assumed that, in the optical deflection device 2, the electrodes b and c are applied with and fixed to potentials 0 volt and 10 volts, respectively.

Figure 9A:
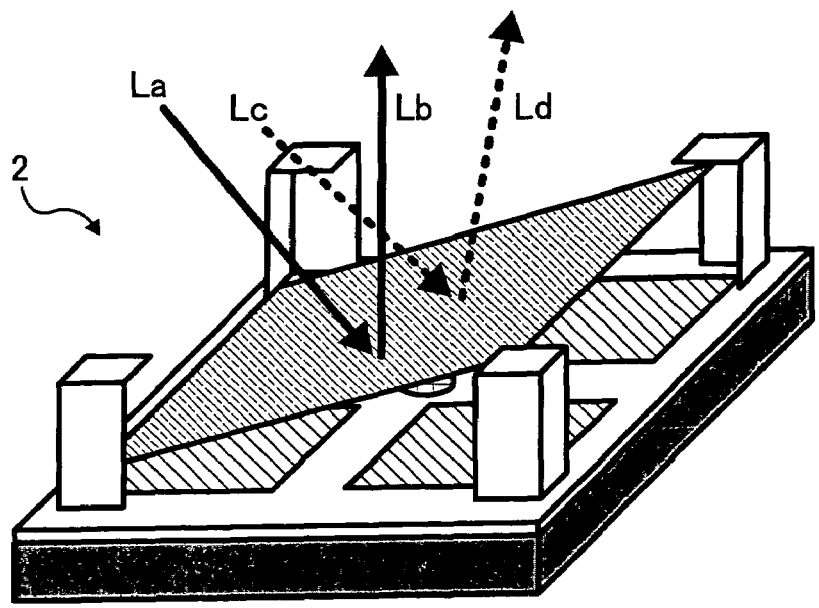
FIG. 9A is a diagram illustrating an optical deflection operation of the optical deflection device illustrated in FIGS. 6A to 6C with respect to a first axis.

In FIG. 9A, the potentials of the electrodes a and d are set to 0 volt and 10 volts, respectively. Further, the potential of the fulcrum electrode 106 electrically connected to the conductive layer 107b of the plate member 107 is set to 10 volts. In this case, a potential difference between the conductive layer 107b of the plate member 107 and the electrodes a and b is 10 volts, while a potential difference between the conductive layer 107b of the plate member 107 and the electrodes c and d is 0 volt. Therefore, the plate member 107 revolves toward the electrodes a and b by the angle $\theta$. The first incident light La tilted by an angle $2\theta$ with respect to a direction perpendicular to the substrate 101 is reflected by the substrate 101 in the direction perpendicular to the substrate 101 (i.e., ON-reflection in the first axial direction). Meanwhile, the second incident light Lc tilted by an angle $2\phi$ with respect to the direction perpendicular to the substrate 101 is not reflected by the substrate 101 in the direction perpendicular to the substrate 101 (i.e., OFF-reflection in the first axial direction).

Figure 9B:
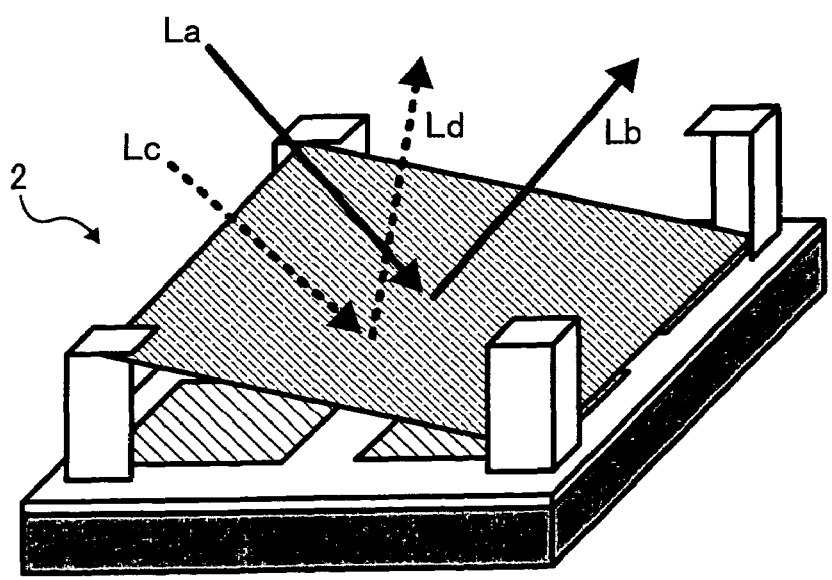
FIG. 9B is a diagram illustrating another optical deflection operation of the optical deflection device illustrated in FIGS. 6A to 6C with respect to the first axis.

In FIG. 9B, the potentials of the electrodes a and d are set to 0 volt and 10 volts, respectively. Further, the potential of the fulcrum electrode 106 is set to 0 volt. In this case, the potential difference between the conductive layer 107b of the plate member 107 and the electrodes a and b is 0 volt, while a potential difference between the conductive layer 107b of the plate member 107 and the electrodes 103c and 103d is 10 volts. Therefore, the plate member 107 revolves toward the electrodes c and d by an angle $-\theta$. The first incident light La is not reflected by the substrate 101 in the direction perpendicular to the substrate 101 (i.e., OFF-reflection in the first axial direction). The second incident light Lc is also not reflected by the substrate 101 in the direction perpendicular to the substrate 101 (i.e., OFF-reflection in the first axial direction).

Figure 10A:
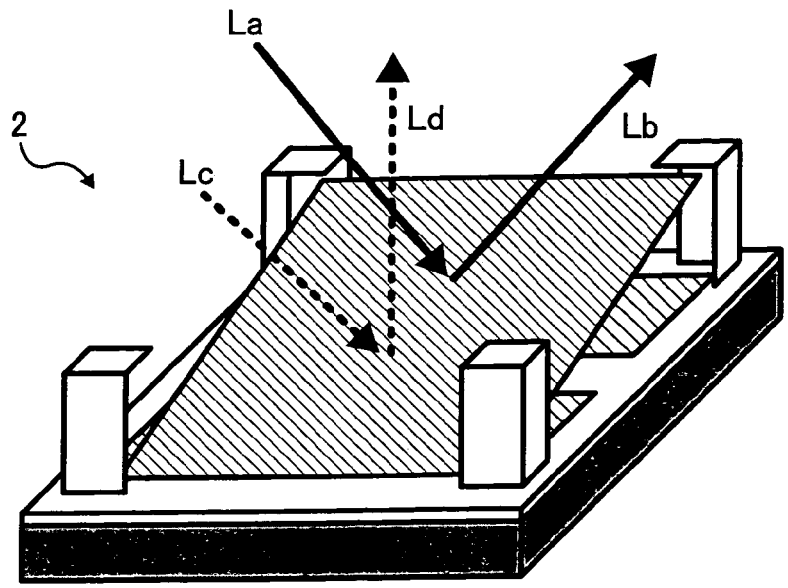
FIG. 10A is a diagram illustrating an optical deflection operation of the optical deflection device illustrated in FIGS. 6A to 6C with respect to a second axis.

In FIG. 10A, the potentials of the electrodes a and d are set to 10 volts and 0 volt, respectively. Further, the potential of the fulcrum electrode 106 is set to 10 volts. In this case, the potential difference between the conductive layer 107b of the plate member 107 and the electrodes a and c is 0 volt, while a potential difference between the conductive layer 107b of the plate member 107 and the electrodes b and d is 10 volts. Therefore, the plate member 107 revolves toward the electrodes b and d by the angle $\phi$. The first incident light La is not reflected by the substrate 101 in the direction perpendicular to the substrate 101 (i.e., OFF-reflection in the second axial direction). Meanwhile, the second incident light Lc is reflected by the substrate 101 in the direction perpendicular to the substrate 101 (i.e., ON-reflection in the second axial direction).

Figure 10B:
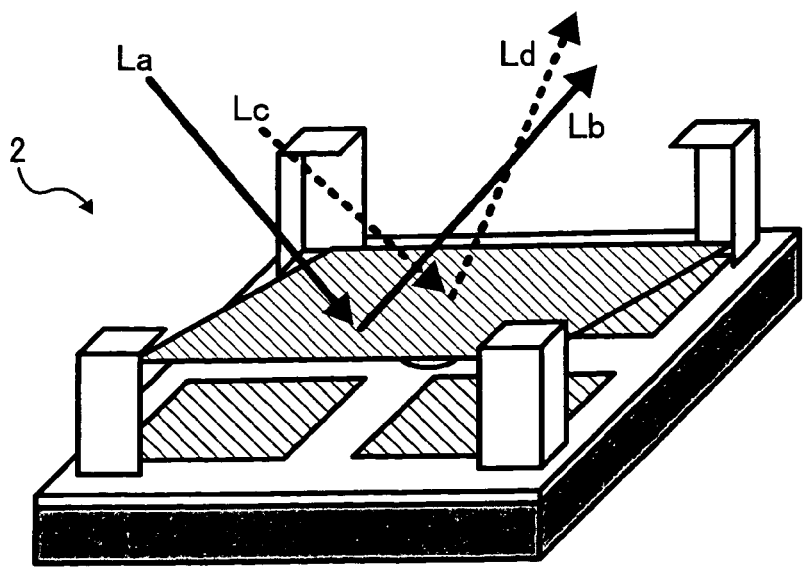
FIG. 10B is a diagram illustrating another optical deflection operation of the optical deflection device illustrated in FIGS. 6A to 6C with respect to the second axis.

In FIG. 10B, the potentials of the electrodes a and d are set to 10 volts and 0 volt, respectively. Further, the potential of the fulcrum electrode 106 is set to 0 volt. In this case, the potential difference between the conductive layer 107b of the plate member 107 and the electrodes a and c is 10 volts, while a potential difference between the conductive layer 107b of the plate member 107 and the electrodes b and d is 0 volt. Therefore, the plate member 107 revolves toward the electrodes a and c by the angle $-\phi$. The first and second incident lights La and Lc are not reflected by the substrate 101 in the direction perpendicular to the substrate 101 (i.e., OFF-reflection in the second axial direction).

As described above, the potentials of the two electrodes and the conductive layer 107b of the plate member 107 are switched between two levels. Accordingly, the plate member 107 is deflected in the first axial direction by the angle $\theta$ and in the second axial direction by the angle $\phi$.

Figure 11A:
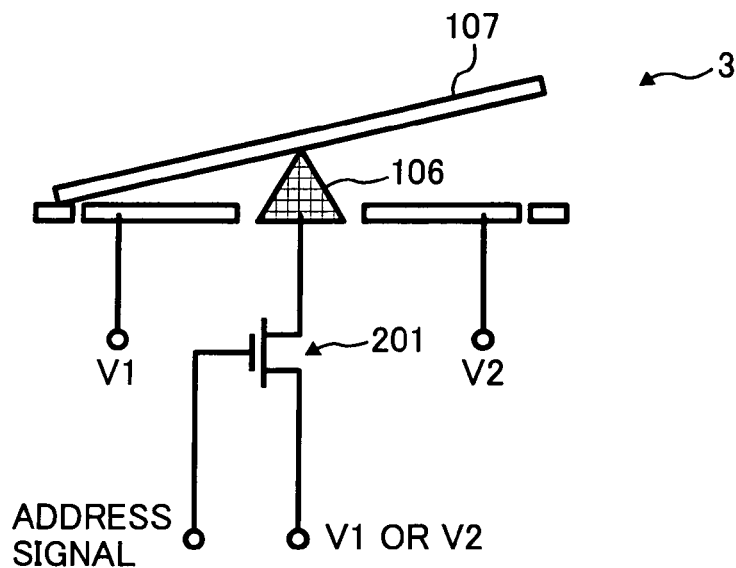
FIG. 11A is a diagram illustrating a configuration of an optical deflection device according to another embodiment of the present invention.
Figure 11B:
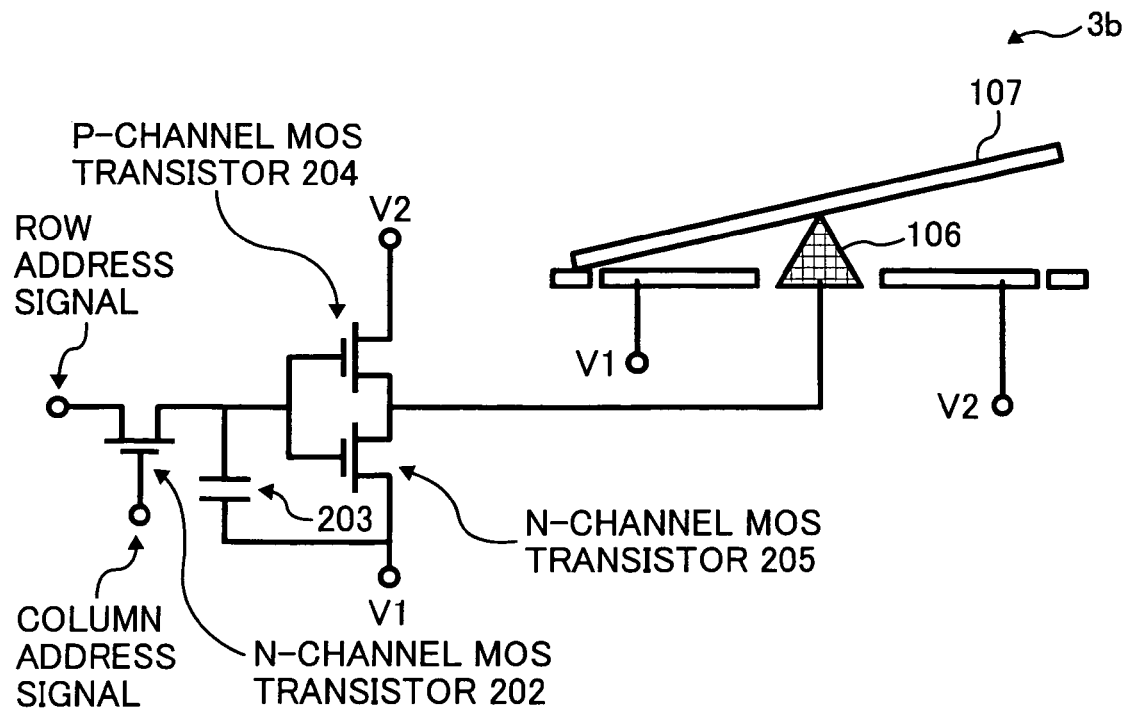
FIG. 11B is a diagram illustrating a configuration of an optical deflection device according to another embodiment of the present invention.

With reference to FIGS. 11A and 11B, an optical deflection device 3 according to another embodiment of the present invention and an optical deflection device 3b according to still another embodiment of the present invention are described. In the optical deflection devices 3 and 3b, the potential of the fulcrum electrode 106 electrically connected to the conductive layer 107b of the plate member 107, i.e., the potential of the conductive layer 107b of the plate member 107, is switched between two levels by at least one three-terminal active element.

In the optical deflection device 3 illustrated in FIG. 11A, a MOS (metal-oxide semiconductor) transistor 201 is used as the three-terminal active element, for example. Either one of a drain and a source of the MOS transistor 201 is used as a first terminal, and the other one of the drain and the source of the MOS transistor 201 is used as a third terminal. A gate of the MOS transistor 201 is used as a second terminal. The first terminal is connected to the fulcrum electrode 106 electrically connected to the conductive layer 107b of the plate member 107. The third terminal is applied with a signal for determining the potential (V1 or V2) applied to the conductive layer 107b of the plate member 107. The second terminal is applied with an address signal for selecting the MOS transistor 201. With this configuration, the potential of the conductive layer 107b of the plate member 107 is switched between V1 and V2.

The optical deflection device 3b illustrated in FIG. 11B, on the other hand, includes a MOS transistor 202 (e.g., n-channel MOS transistor), a C-MOS (complementary metal-oxide semiconductor) transistor 204 (e.g., p-channel MOS transistor), a CMOS transistor 205 (e.g., n-channel MOS transistor), and a capacitor 203, for example. The MOS transistor 202 is used as an active element which turns on and off according to a row address signal and a column address signal, for example. The capacitor 203 retains a potential. The C-MOS transistors 204 and 205 are used as active elements of high input impedance and function as inverters.

In the optical deflection device 3b, an input terminal of each of the C-MOS transistors 204 and 205 is connected to the capacitor 203. Thus, a potential applied to the input terminal can be retained by the capacitor 203 for a predetermined time. During this predetermined time, the C-MOS transistor 205 is electrically continuous, and the fulcrum electrode 106 is applied with the potential V1. Therefore, even if the address signals are switched on and off during a time shorter than a time during which the plate member 107 is deflected, the potential of the conductive layer 107b of the plate member 107 can be temporarily retained by the capacitor 203. Thus, a potential output from each of the C-MOS transistors 204 and 205 can be retained. As a result, the electrostatic force generated between the conductive layer 107b of the plate member 107 and the electrodes can be maintained longer than the time during which the deflection of the plate member 107 completes. Further, the address signals can be transmitted, with a transmitting speed of the address signals not decreased.

Figure 12:
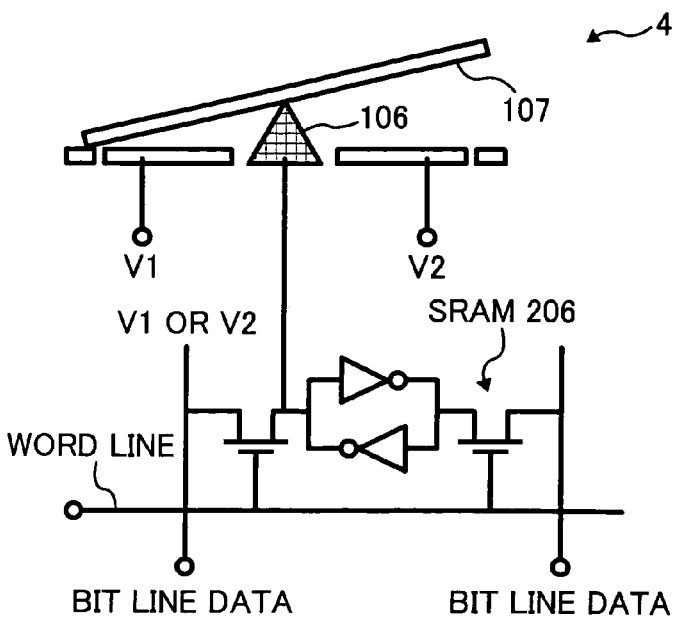
FIG. 12 is a diagram illustrating a configuration of an optical deflection device according to another embodiment of the present invention.

With reference to FIG. 12, an optical deflection device 4 according to another embodiment of the present invention is described. In the optical deflection device 4 illustrated in FIG. 12, the fulcrum electrode 106 electrically connected to the conductive layer 107b of the plate member 107 is connected to one of output terminals of an SRAM (static random access memory) 206. According to a word line signal, a bit line signal (i.e., V1 or V2) read from the SRAM 206 is input in the fulcrum member 106 to switch the potential of the fulcrum electrode 106 between the two levels (i.e., V1 and V2).

The plate member 107 is tilted and displaced in a predetermined direction according to the potential level (i.e., V1 or V2) of the fulcrum electrode 106. For example, in a two-dimensional array, in which a plurality of the optical deflection devices 4 are placed in rows and columns, bit lines are used for transferring the column address signal, and word lines are used for transferring the row address signal. Even if a time for data writing in the SRAM 206 is shorter than a time for deflection of the plate member 107, data is retained in the SRAM 206. Therefore, a driving potential continues to be applied to the plate member 107 for a longer time than a time for completing deflection of the plate member 107.

Figure 13:
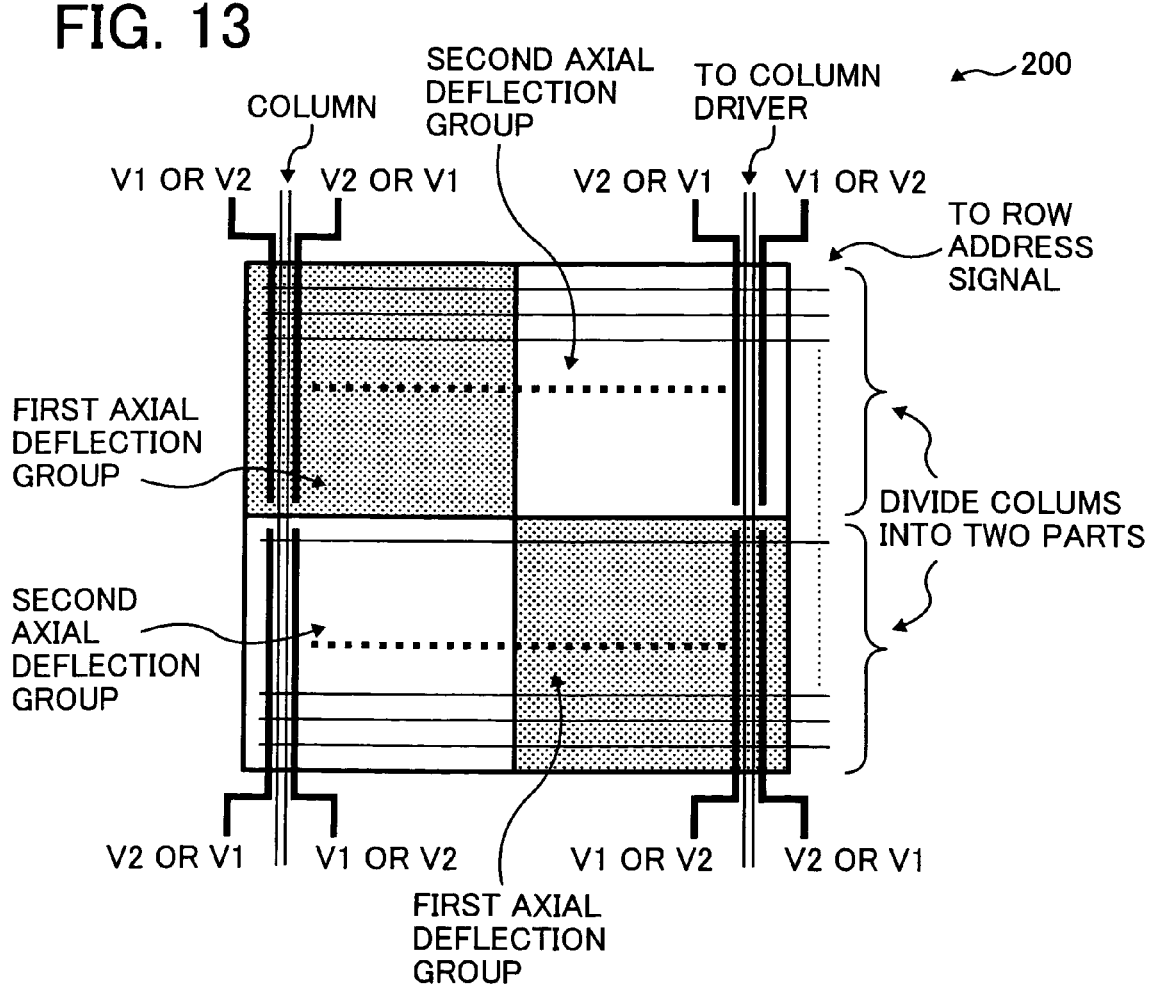
FIG. 13 is a diagram illustrating a configuration of an optical deflection array according to an embodiment of the present invention.

With reference to FIG. 13, an optical deflection array according to an embodiment of the present invention is described. FIG. 13 illustrates a two-dimensional optical deflection array 200 including a plurality of the optical deflection devices 2 illustrated in FIG. 6A to 6C, for example. In the optical deflection array 200, the electrodes b and c placed diagonally relative to each other are fixed to potentials of two levels (e.g., V1 and V2), respectively. Further, rows of the entire optical deflection array 200 are divided into two regions such that each of the two regions includes half of the optical deflection devices 2 forming the optical deflection array 200. Accordingly, a plurality of the optical deflection devices 2 included in one of the two regions and another plurality of the optical deflection devices 2 included in the other one of the two regions are controlled by two separate axis selecting driver circuits, respectively. That is, while the electrodes b and c are temporarily fixed to the potentials V1 (first level) and V2 (second level), respectively, selection is made by the two separate axis selecting driver circuits between a case in which the potentials of the electrodes a and d are set to the first level and the second level, respectively, and a case in which the potentials of the electrodes a and d are set to the second level and the first level, respectively. Therefore, to display two lights input from different directions, for example, the axis is selected according to the regions, and the two lights are output and displayed in a predetermined display time.

Figure 14A:
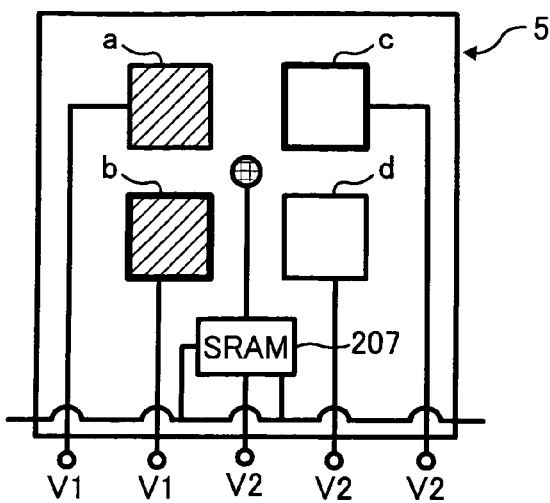
FIG. 14A is a diagram illustrating an optical deflection device according to an embodiment of the present invention.
Figure 14B:
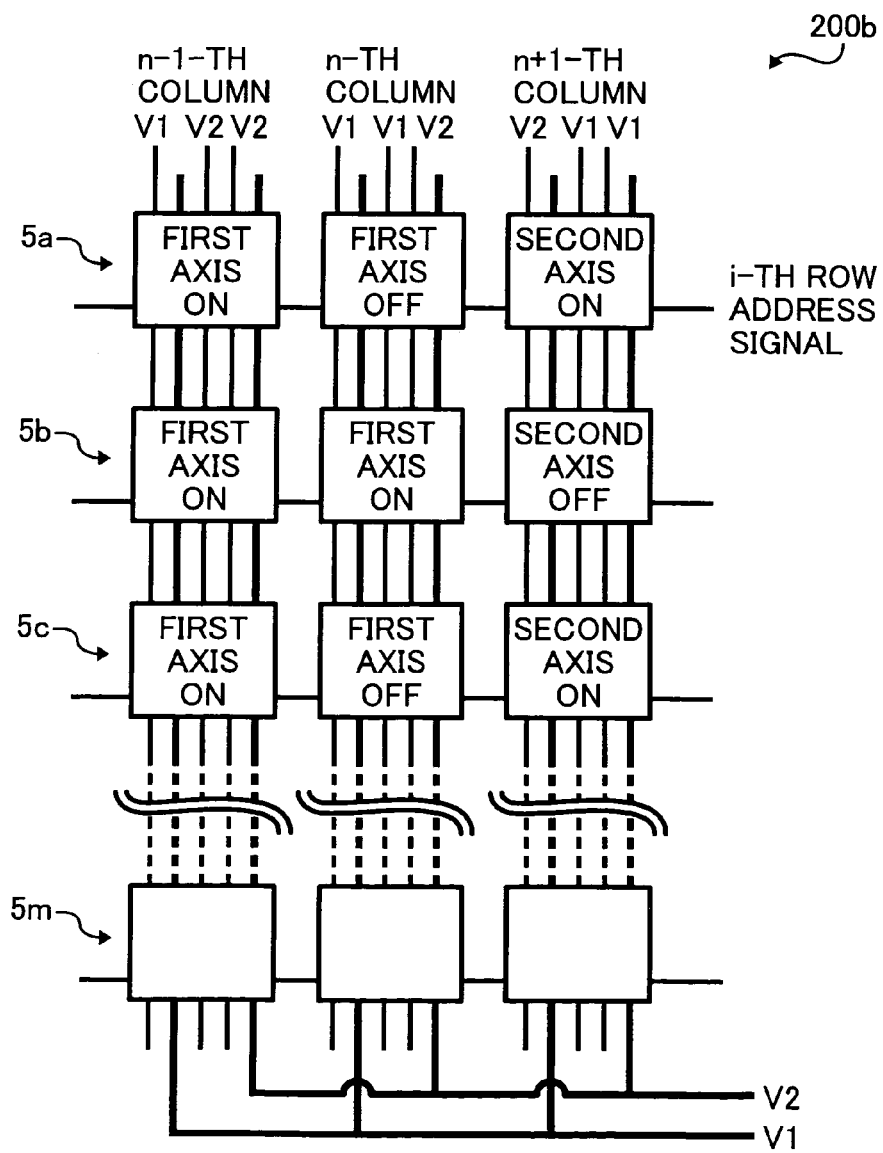
FIG. 14B is a diagram illustrating a configuration of a two-dimensional optical deflection array including a plurality of the optical deflection devices illustrated in FIG. 14A.

FIG. 14A illustrates an optical deflection device 5 according to another embodiment of the present invention. The optical deflection device 5 includes a SRAM 207. FIG. 14B illustrates an optical deflection array 200b including a plurality of the optical deflection devices 5. In the optical deflection array 200b, the electrodes b and c placed diagonally relative to each other are fixed to the potentials V1 (first level) and V2 (second level), respectively, for example. Switching of the potentials of the electrodes a and d between the first and second levels is performed by a column driver circuit, for example, for each column.

Figure 15:
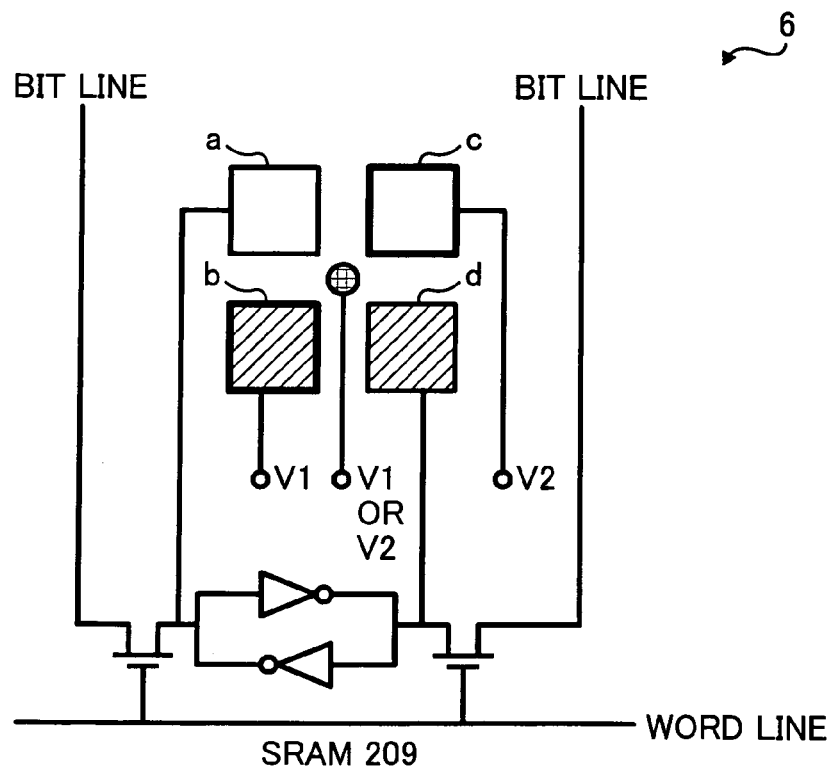
FIG. 15 is a diagram illustrating a configuration of an optical deflection device according to another embodiment of the present invention.

FIG. 15 illustrates an optical deflection device 6 according to another embodiment of the present invention. In the optical deflection device 6, an SRAM 209 is used for selecting an axis (i.e., the first or second axis). If one of two output potentials (i.e., voltages) from the SRAM 209 is turned on, the other of the two output potentials is turned off. That is, the two output potentials are complementary with each other. In light of this, the potentials of two of the four electrodes a to d are fixed, and the remaining two of the four electrodes a to d are connected to the two output potentials of the SRAM 209. For example, the potentials of the electrodes b and c are fixed to the first level (V1) and second level (V2), respectively. Further, the electrode a is connected to one of the two complementary output potentials of the SRAM 209, and the electrode d is connected to the other of the two complementary output potentials of the SRAM 209. With this configuration, the potentials output from the SRAM 209 change the potentials of the electrodes a and d between the first and second levels. The potential of the fulcrum electrode 106 electrically connected to the conductive layer 107b of the plate member 107 can be switched between the first and second levels by the switch using the active element employed in the optical deflection device 3, or the SRAM 206 employed in the optical deflection device 4, for example.

Figure 16:
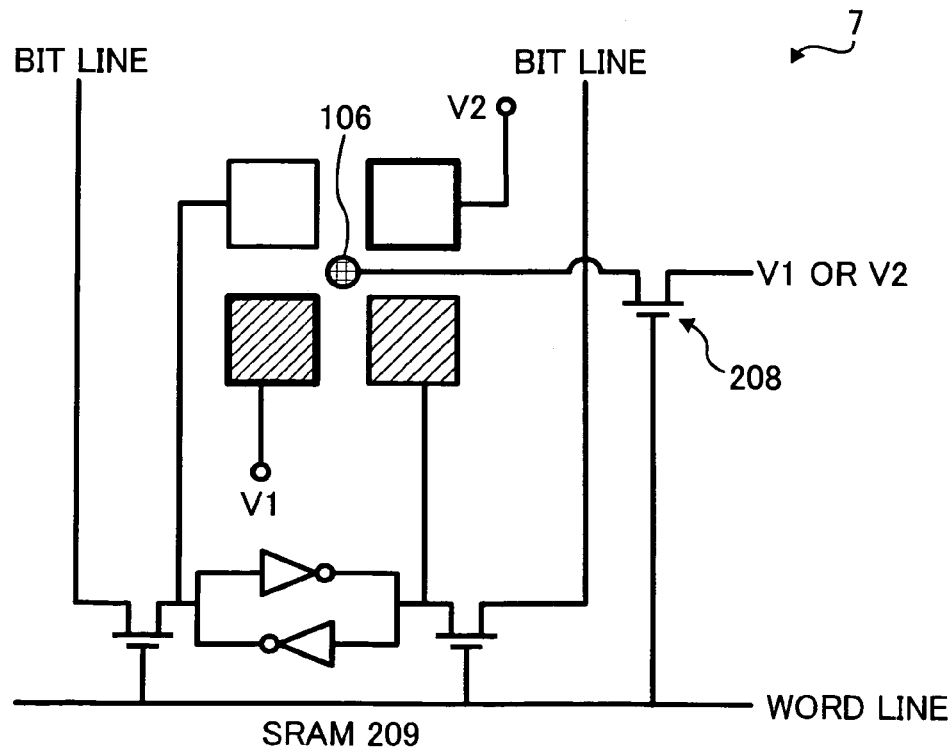
FIG. 16 is a diagram illustrating a configuration of an optical deflection device according to another embodiment of the present invention.

FIG. 16 illustrates an optical deflection device 7 according to another embodiment of the present invention. The optical deflection device 7 includes an active element 208. In the optical deflection device 7, the fulcrum electrode 106 electrically connected to the conductive layer 107b of the plate member 107 is connected to a first terminal of the active element 208. Meanwhile, a second terminal of the active element 208 is connected to a word line of the SRAM 209. With this configuration, switching between the first and second axes and writing of data of the tilting deflection of the plate member 107 can be performed by a single row address signal (i.e., a single word line). For example, V1 is input in the SRAM 209 to tilt the plate member 107 in the first axial direction.

Figure 17A:
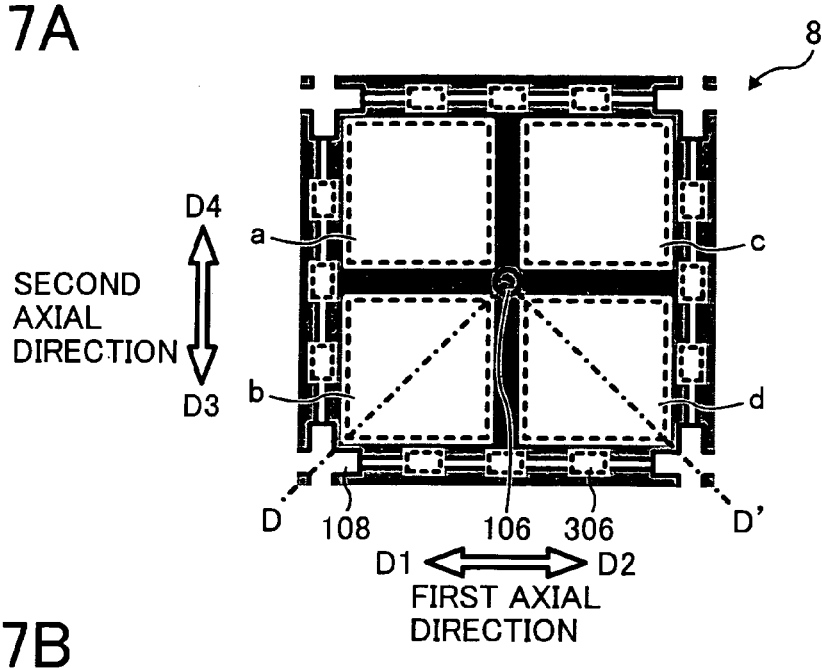
FIG. 17A is a plain view of an optical deflection device according to another embodiment of the present invention.
Figure 17B:
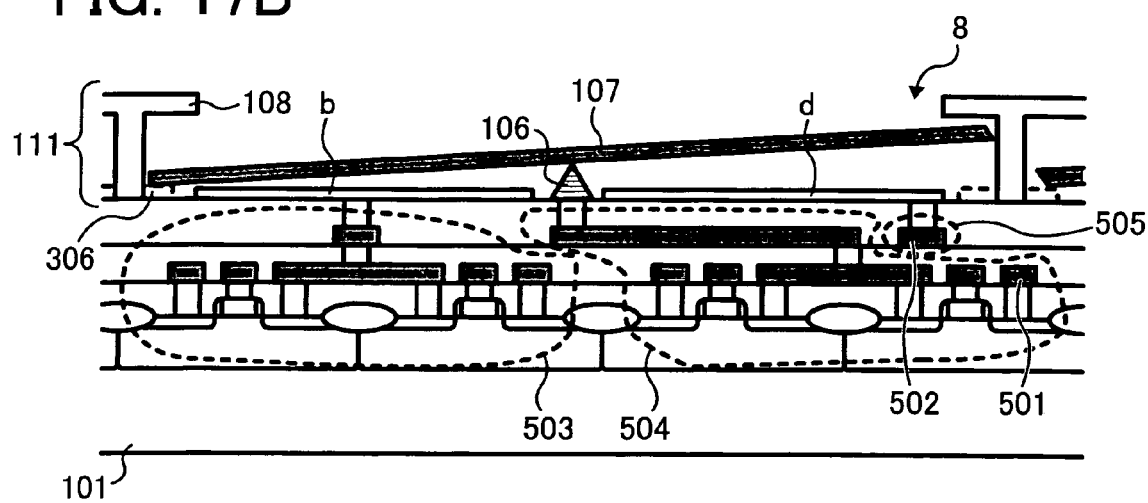
FIG. 17B is a cross-sectional view of the optical deflection device illustrated in FIG. 17A cut along a line D-D'.
Figure 17C:
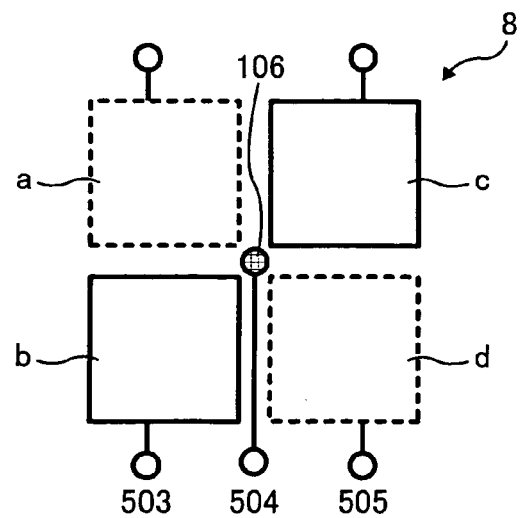
FIG. 17C is a diagram illustrating a configuration of the optical deflection device illustrated in FIGS. 17A and 17B.

With reference to FIGS. 17A to 17C, an optical deflection device 8 according to another embodiment of the present invention is described. FIG. 17A is a top view of the optical deflection device 8. FIG. 17B is a sectional view of the optical deflection device 8 cut along a line D-D'. FIG. 17C illustrates a configuration of the optical deflection device 8. Detailed description of the optical deflection device 8 is described in Japanese laid-open patent publication no. 2004-78136 proposed by the present inventors, and the entire contents of which are hereby incorporated by reference herein.

As illustrated in FIG. 17B, the optical deflection device 8 includes an optical deflection unit 111, semiconductor memory devices 503 and 504, an external potential supply line 505, first and second layer wirings 501 and 502, and the substrate 101. The semiconductor memory devices 503 and 504 are placed between the substrate 101 and the optical deflection unit 111. The optical deflection unit 111 includes the four electrodes a to d, the plate member 107, the fulcrum electrode 106, the regulating members 108, and a plurality of contact regions 306. The plurality of contact regions 306 are provided for reducing a contact area of the plate member 107 with the substrate 101 when the plate member 107 is tilted and contacts the substrate 101.

As illustrated in FIG. 17C, the electrodes a to d and the fulcrum electrode 106 are connected to the semiconductor memory devices 503 and 504 and the external potential supply line 505. Each of FIGS. 17A to 17C illustrates a configuration of one of a plurality of the optical deflection devices 11 placed in a two-dimensional optical deflection array.

In the optical deflection device 8, the four electrodes a to d are provided to face the plate member 107. Two electrodes of the four electrodes a to d placed diagonally relative to each other across the fulcrum electrode 106 (i.e., the electrodes a and d in this example) are electrically connected to the external potential supply line 505. The other two electrodes placed diagonally relative to each other across the fulcrum electrode 106 (i.e., the electrodes b and c in this example) are connected to two complementary potentials output from the semiconductor memory device 503. The fulcrum electrode 106 contacts and applies a potential to the plate member 107 including the light reflecting region 107a, or is applied with a fixed potential to be electrically connected to the plate member 107. The fulcrum electrode 106 contributes to control of the optical deflection direction, and is connected to an arbitrary one of two complementary potentials output from the semiconductor memory device 504.

As illustrated in FIG. 17B, the electrode b in the optical deflection unit 111 is electrically connected, through contact holes, to the first and second layer wirings 501 and 502, and to the semiconductor memory device 503. Although not illustrated, the electrode c is also electrically connected, through contact holes, to the first and second layer wirings 501 and 502, and to the semiconductor memory device 503.

The electrodes b and c are connected to the complementary potentials output from the semiconductor memory device 503. The semiconductor memory device 503 has a potential retaining ability. Therefore, even after transmission of optical deflection data indicating an optical deflection direction is completed, the potentials of the electrodes b and c are retained by the semiconductor memory device 503.

The fulcrum electrode 106 is also electrically connected, through contact holes, to the first and second layer wirings 501 and 502, and to an arbitrary one of potentials output from the semiconductor memory device 504. Similar to the semiconductor memory device 503, the semiconductor memory device 504 also has the potential retaining ability. Therefore, even after transmission of optical deflection data indicating an optical deflection direction is completed, the potential of the fulcrum electrode 106 is retained by the semiconductor memory device 504.

The electrode d is electrically connected, through contact holes, to the second layer wiring 502 and to the external potential supply line 505. Although not illustrated, the electrode a is also electrically connected, through contact holes, to the second layer wiring 502 and to the external potential supply line 505. The electrodes a and d, which are both connected to the external potential supply line 505, are neither necessarily electrically connected with each other nor at an equal potential. In fact, the electrodes 305a and 305d are connected to two different external potential supply lines 505, which are preferably complementary to each other.

The term "complementary" refers here to a relationship between signals 1 and 0, for example, which correspond to X volts and 0 volt, respectively. When the signal 1 is input in an inverter circuit, the signal 0 is output from the inverter circuit. Conversely, when the signal 0 is input in the inverter circuit, the signal 1 is output from the inverter circuit. That is, when one of two mutually complementary signals is 1, the other one of the two mutually complementary signals is 0.

FIG. 17B illustrates a CMOS circuit which is a part of circuits forming the semiconductor memory devices 503 and 504. Space capacity is formed between the plate member 107 and its opposing electrodes a to d so that electric charge is accumulated according to a difference among potentials. Therefore, the semiconductor memory device 504 may be formed by a single switch (e.g., transistor) and the space capacity. The semiconductor memory devices 503 and 504 are formed by combining transistors manufactured by a generally used silicon semiconductor manufacturing technique. A detailed description of the structures of the semiconductor memory devices 503 and 504 is, therefore, omitted.

In the optical deflection device 8, the electrodes a and d are connected to the external potential supply lines 505 to be applied with the potentials X volts and 0 volt, respectively. These potentials X volts and 0 volt are not changed in the optical deflection operations in the four directions. Therefore, when a plurality of the optical deflection devices 8 are placed in an optical deflection array, the external potential supply lines 505 connected to the two electrodes a and d of one optical deflection device 8 can be shared by the electrodes a and d of an adjacent optical deflection device 8. Accordingly, the number and the area of the external potential supply lines 505 in the optical deflection array can be substantially reduced.

Further, in the optical deflection device 8, potentials output from the two semiconductor memory devices 503 and 504 are applied to the other two mutually diagonal electrodes b and c and to the fulcrum electrode 106 which applies a potential to the plate member 107. Accordingly, the semiconductor memory devices 503 and 504 can store optical deflection data in the form of potential. Since the optical deflection data thus stored is retained in the form of potential even after completion of data transmission, an optical deflection operation (i.e., titling deflection) of the optical deflection device 8 is maintained over an arbitrary time duration. As a result, the external potential supply lines 505 connected to the semiconductor memory devices 503 and 504 can be arranged in a matrix, i.e., arranged both in a column direction and a row direction in a two-dimensional array. Therefore, the number and the area of the external potential supply lines 505 included in the optical deflection array can be substantially reduced. Accordingly, the optical deflection array formed by a plurality of the optical deflection devices 8 is highly integrated and capable of performing the optical deflection operation in four directions along the two axes.

In the optical deflection device 8, the two complementary potentials output from the semiconductor memory device 503 to the other two mutually diagonal electrodes b and c carry data determining an optical deflection axial direction (i.e., axial direction in which the optical deflection operation is performed). Meanwhile, the potential output from the other semiconductor memory device 504 to the fulcrum electrode 106, which is electrically connected to the plate member 107 including the light reflecting region 107a, carry data determining an optical deflection direction (i.e., direction in which the plate member 107 tilts along an arbitrary optical deflection axis).

Figures 18, 19:
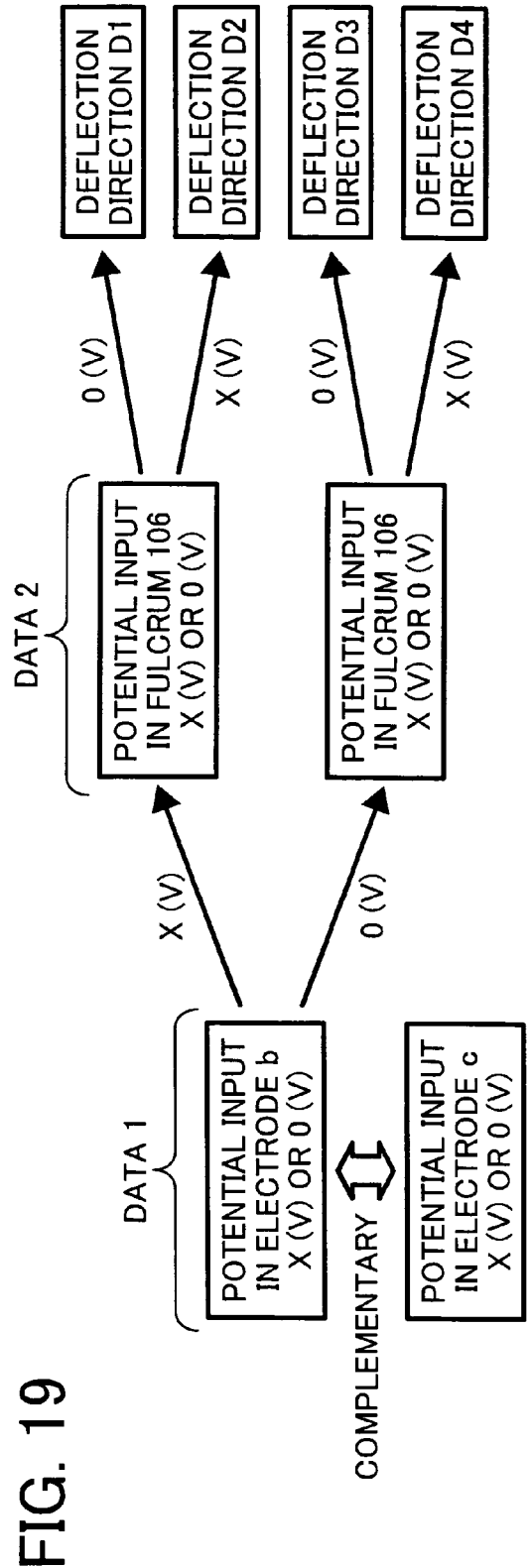
FIG. 18 is a table indicating relationships between voltages applied to electrodes and optical deflection directions in the optical deflection device illustrated in FIGS. 17A to 17C.
FIG. 19 is a diagram indicating relationships between combinations of potentials applied to electrodes and optical deflection directions in the optical deflection device illustrated in FIGS. 17A to 17C.

If the electrodes a to d and the fulcrum electrode 106 are applied with potentials according to four combination patterns indicated in a table of FIG. 18, the optical deflection operation can be performed in the four different directions (i.e., directions D1 to D4). The optical deflection device 8 operates in a similar manner to the optical deflection device 2 illustrated in FIGS. 8A to 8D.

Relationships between combinations of potentials applied to the electrodes of the optical deflection device 8 and the optical deflection directions are illustrated in FIG. 19.

For example, the electrode a is first fixed to the potential X volts, while the electrode d is fixed to the potential 0 volt. These two potentials X volts and 0 volt are supplied from the external potential supply lines 505. Further, the electrode b is applied with the potential X volts, while the electrode c is applied with the complementary potential 0 volt. As a result, as illustrated in FIGS. 18 and 19, the plate member 107 tilts in the direction D1 or D2. Conversely, if the electrode b is applied with the potential 0 volt and the electrode c is applied with the complementary potential X volts, the plate member 107 tilts in the direction D3 or D4. That is, the signals carrying the data determining the optical deflection axial direction are input in the electrodes b and c in form of complementary potentials, and the optical deflection axis can be determined.

Then, the fulcrum electrode 106 is applied with the potential 0 volt, so that the plate member 107 tilts in the direction D1 or D4. Conversely, if the fulcrum electrode 106 is applied with the potential X volts, the plate member 107 tilts in the direction D2 or D3. That is, the signal carrying the data determining the optical deflection direction is input in the fulcrum electrode 106 in form of one of the complementary potentials, and the direction of the optical deflection can be determined.

As illustrated in FIG. 19, the optical deflection can be performed in one of the four directions along either one of the two axes, by inputting in the electrode b a first data determining the optical deflection axial direction and by inputting in the fulcrum electrode 106 a second data determining the optical deflection direction (i.e., input of two-bit information signals). Accordingly, an amount of optical deflection data can be reduced, compared with a case in which information signals are separately transmitted to the five electrodes, i.e., the electrodes a to d and the fulcrum electrode 106. Therefore, a speed of transmitting data to an entire optical deflection array chip can be reduced, and thus a control chip of a relatively low price can be used for processing image data. Further, since the two-bit information signals input in the electrodes are retained in the form of the potentials output from the semiconductor memory devices, the optical deflection operation continues to be performed even after completion of data transmission until a subsequent optical deflection data is input in the optical deflection device 8.

Figure 20:
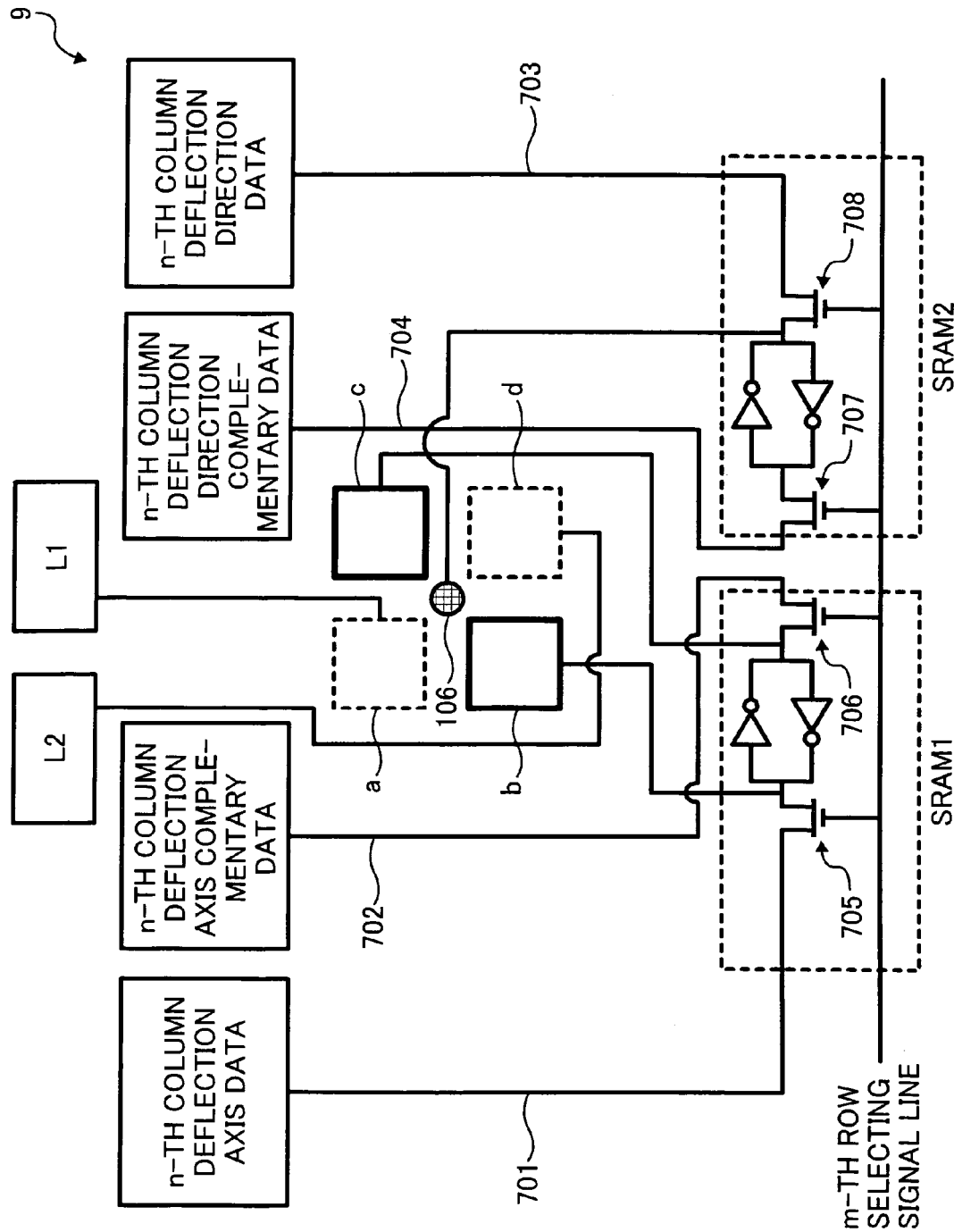
FIG. 20 is a diagram illustrating a configuration of an optical deflection device according to another embodiment of the present invention.

With reference to FIG. 20, an optical deflection device 9 according to another embodiment of the present invention is described. The optical deflection device 9 is different from the optical deflection device 8 in that the semiconductor memory devices 503 and 504 used in the optical deflection device 8 are replaced by SRAM1 and SRAM2 in the optical deflection device 9. FIG. 20 illustrates sources of potentials applied to the electrodes a to d and the fulcrum electrode 106. Further, FIG. 20 illustrates one of a plurality of the optical deflection devices 9 located in the m-th row and the n-th column (m is a positive integral number, and n is a positive integral number other than m) in a two-dimensional optical deflection array. Each of SRAM1 and SRAM2 is a 6Tr-SRAM (6 transistor-SRAM) formed by combining six transistors of high aggregation.

The optical deflection unit 111 of the optical deflection device 9 includes the plate member 107 which serves as a mirror and which does not have a fixed edge portion. Therefore, the plate member 107 can be driven at a relatively low voltage, such as five volts. For example, a standard area of the 6Tr-SRAM driven at 5 volts occupying a single optical deflection device is approximately 100 μm². Thus, an area occupied by two 6Tr-SRAMs is approximately 200 μm. That is, one optical deflection device can be formed by the 6Tr-SRAMs occupying a 15 μm×15 μm area. If an optical deflection array of XGA resolution is formed by a plurality of the thus formed optical deflection devices, the size of the optical deflection array can be reduced down to 15.4 mm×11.6 mm.

In FIG. 20, n-th column deflection axis data and its complementary data, and n-th column deflection direction data and its complementary data, are applied to n-th column external potential supply lines 701, 702, 703, and 704, respectively. If an m-th row selecting signal line is selected and an arbitrary potential is supplied, switches (i.e., transistors 705 and 706) of the SRAM1 (corresponding to the semiconductor memory device 503) are turned on, and switches (i.e., transistors 707 and 708) of the SRAM2 (corresponding to the semiconductor memory device 504) are turned on. Then, two data sets of the n-th column are input in the SRAM1 from the external potential supply lines 701 and 702, and other two data sets of the n-th column are input in the SRAM2 from the external potential supply lines 703 and 704. The data are stored in the SRAM1 and SRAM2 in the form of potentials. The potentials thus stored are retained even after the switches 705 to 708 of the SRAM1 and SRAM2 are turned off.

Further, potentials are applied to the electrodes a and d from external potential supply lines L1 and L2, respectively. Therefore, if the SRAM1 and SRAM2 are connected to the electrodes b and c and the fulcrum electrode 106, the optical deflection operation is performed according to the optical deflection data. Further, the optical deflection operation is stably performed, without being affected by a time in which the optical deflection operation is maintained.

Figure 21:
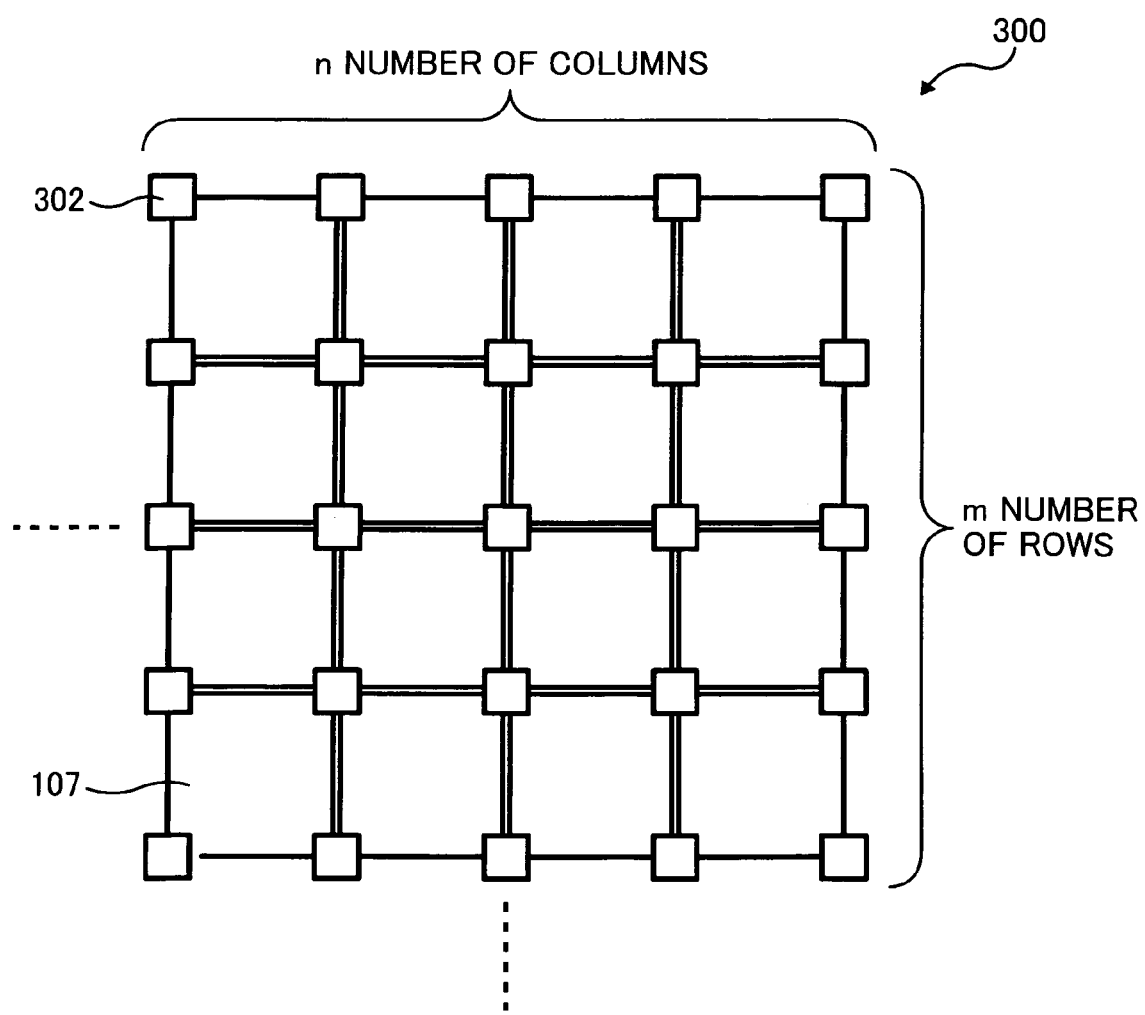
FIG. 21 is a diagram illustrating an optical deflection array including a plurality of the optical deflection devices illustrated in FIG. 20.

A plurality of the optical deflection devices 8 illustrated in FIGS. 17A to 17C may be placed in a one-dimensional optical deflection array or in a two-dimensional optical deflection array. FIG. 21 illustrates a top view of a two-dimensional optical deflection array 300 in which the plurality of the optical deflection devices 8 are placed in n number of rows and m number of columns. With the plurality of the optical deflection devices 8 placed as described above, the optical deflection array 300 is highly integrated and capable of performing the optical deflection operation in four directions along two axes.

Figure 22:
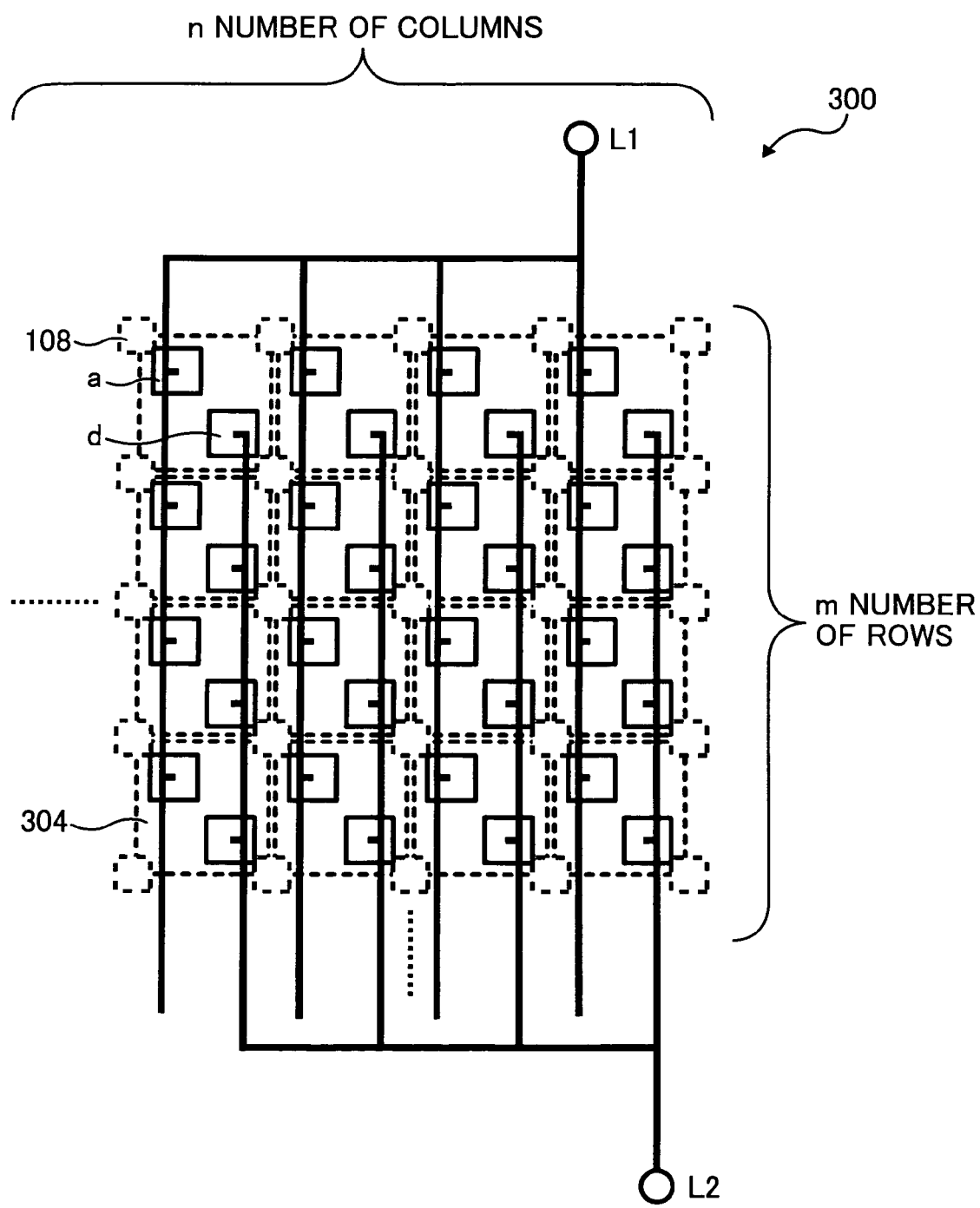
FIG. 22 is a diagram illustrating the optical deflection array illustrated in FIG. 21, in which external potential supply lines are arranged.

As illustrated in FIG. 22, the plurality of the optical deflection devices 8 placed in the optical deflection array 300 is configured, for example, such that the external potential supply line L1 is connected to the electrode a of each of the plurality of the optical deflection devices 8 included in the optical deflection array 300. Meanwhile, the external potential supply line L2 is connected to the electrode d of each of the plurality of the optical deflection devices 8 included in the optical deflection array 300. The external potential supply lines L1 and L2 are arranged to cover the entirety or a part of the plurality of the optical deflection devices 8 forming the optical deflection array 300. In FIG. 22, the regulating members 108 and the plate members 107 are indicated by dotted lines and dashed lines, respectively, and the electrodes a and d are indicated by solid lines. The external potential supply lines L1 and L2 for supplying potentials to the electrodes a and d, respectively, are electrically connected to the electrodes a and d of the entire plurality of the optical deflection devices 8 forming the optical deflection array 300. In this example, metal wiring of the second layer in the semiconductor memory devices 503 and 504 is used for wiring of the external potential supply lines L1 and L2.

Thus configured, the optical deflection array 300 is highly integrated and capable of performing the optical deflection operation in four directions along two axes. Further, with a reduced number of external potential supply lines (i.e., external control signal lines), the optical deflection array 300 is easy to control.

In a similar manner to the optical deflection device 9 illustrated in FIG. 20, each of respective signal lines for transmitting the row selection data, the deflection axis data, the complementary deflection axis data, the deflection direction data, and the complementary deflection direction data is shared by a plurality of the optical deflection devices 8 forming a row or column of the two-dimensional array 300.

Figure 23:
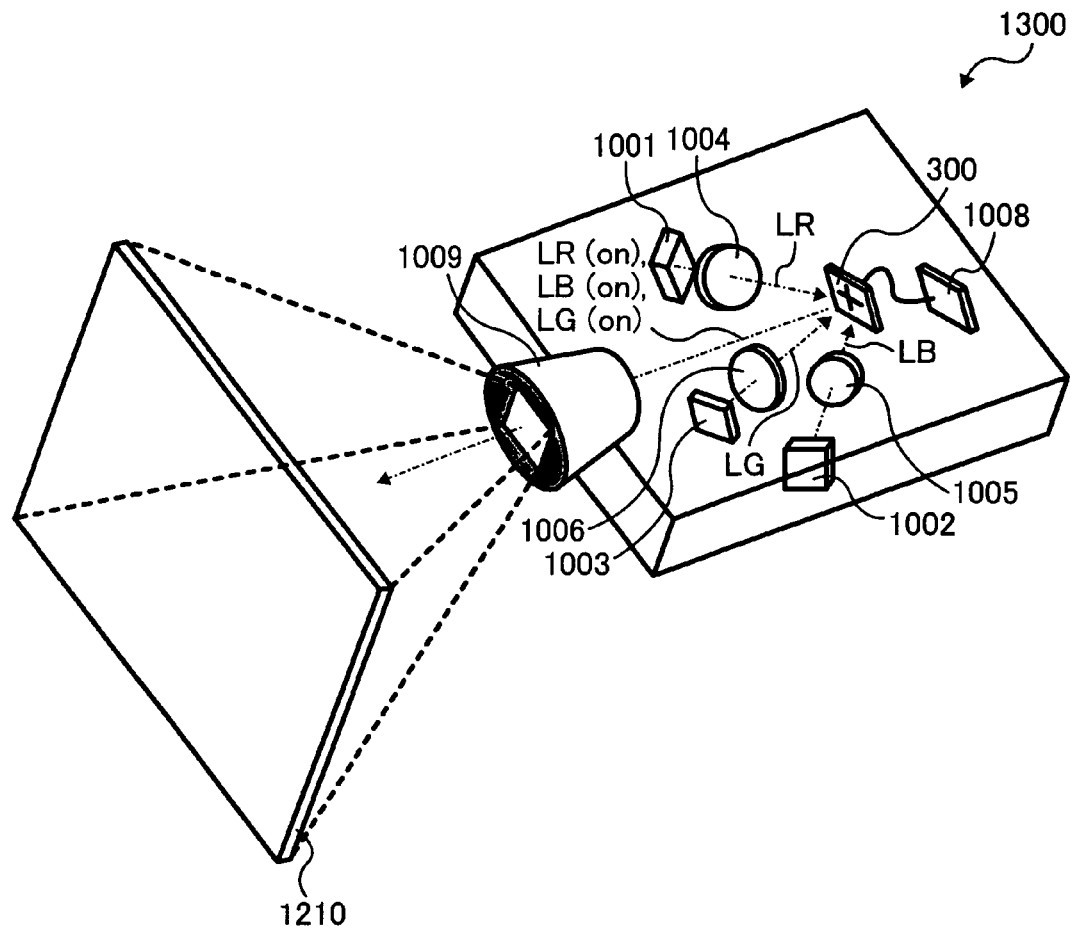
FIG. 23 is a diagram illustrating an image projection display apparatus according to another embodiment of the present invention.

With reference to FIG. 23, an image projection display apparatus 1300 according to another embodiment of the present invention is described. The image projection display apparatus 1300 illustrated in FIG. 23 includes the projection screen 1210 and an optical system 1000 including the optical deflection array 300. In the image projection display apparatus 1300, image data is projected and displayed on the projection screen 1210 (i.e., an image display unit) through the projection lens 1009 of the optical system 1000. By using the optical system 1000 which includes the optical deflection array 300, the image projection display apparatus 1300 is reduced in size and simple in structure, and displays an image of relatively high definition (i.e., high in resolution).

Figure 24:
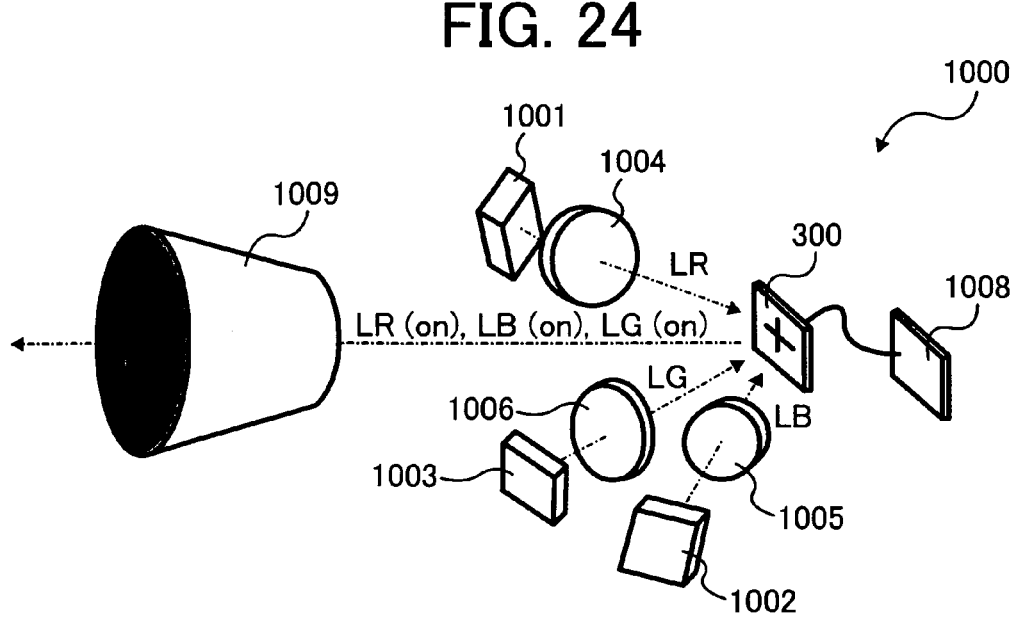
FIG. 24 is a diagram illustrating an optical system used in the image projection display apparatus illustrated in FIG. 23.

With reference to FIG. 24, the optical system 1000 according to an embodiment of the present invention is described. The optical system 1000 illustrated in FIG. 24 includes the projection lens 1009, the optical deflection array 300, a control chip 1008, three light sources 1001, 1002, and 1003, and light-shaping lenses 1004, 1005, and 1006. The light sources 1001, 1002, and 1003 are provided for emitting lights of the three primary colors red (R), blue (B), and green (G), respectively. The optical deflection array 300 performs the optical deflection operation in four directions along two axes, as described above.

Lights LR, LB, and LG of the three primary colors are emitted from the corresponding three light sources 1001, 1002, and 1003, respectively. The lights LR, LB, and LG are then applied, through the light-shaping lenses 1004, 1005, and 1006, to the optical deflection array 300.

According to image data, the optical system 1000 reflects the lights LR, LB, and LG in a direction perpendicular to the surface of the optical deflection array 300 (i.e., in directions of the normals of the lights LR, LB, and LG), and projects and displays the lights through a projection lens 1009 on an external projection screen. A detailed description of a light path in the optical system 1000, switching among the respective colors, and absorption of an OFF-light are omitted here.

Including the highly-integrated optical deflection array 300, the optical system 1000 is reduced in size and simple in structure, and is capable of projecting a high-definition image.

The control chip 1008 converts color data into data determining the optical deflection axial direction and data determining the optical deflection direction (i.e., the tilting direction of the plate member 107 on an arbitrary optical deflection axis). The control chip 1008 then inputs the data in the two semiconductor memory devices 503 and 504 included in each of the plurality of the optical deflection devices 8 forming the optical deflection array 300. Accordingly, the individual optical deflection devices 8 forming the highly-integrated, high-definition optical deflection array 300 can separately perform the optical deflection operation in four directions along two axes.

Figure 25:
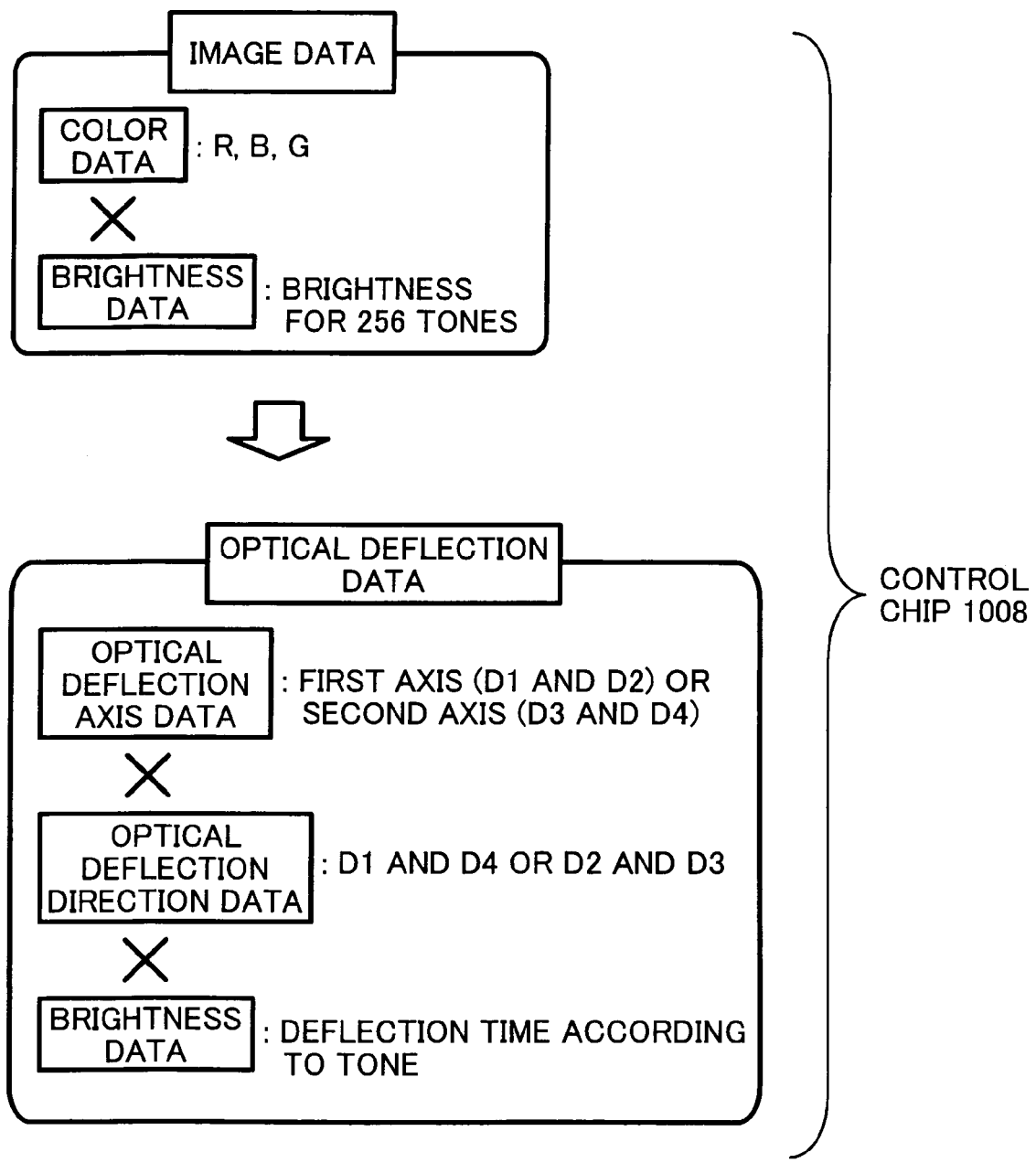
FIG. 25 is a diagram illustrating an operation of a control chip used in the optical system illustrated in FIG. 24.

FIG. 25 illustrates an example of processing performed by the control chip 1008. Image data usually includes color data and brightness data. The color data is converted into the optical deflection axis data and the optical deflection direction data. Meanwhile, the brightness data is converted into optical deflection time data (analog or digital data) according to tone.

The optical deflection data is transmitted in a controlled manner from the control chip 1008 to the external potential supply lines L1 and L2 of the plurality of the optical deflection devices 8 forming the optical deflection array 300 and to the external potential supply lines 505 of the semiconductor memory devices 503 and 504 in the plurality of the optical deflection devices 8.

In the optical system 1000, the lights LR, LB, and LG are applied from three different directions to the plurality of the optical deflection devices 8 forming the optical deflection array 300. The three lights LR, LB, and LG are then reflected according to respective color data and guided into the projection lens 1009 for respective time periods. Since the optical system 1000 uses a single optical deflection array 300, the optical system 1000 can be manufactured at a relatively low cost. Further, the optical system 1000 does not use a color wheel. Therefore, the optical system 1000 is silent, easy to control, small in size, and capable of forming a high-definition image.

As illustrated in FIG. 24, the lights LR, LB, and LG are reflected as reflected lights LR(on), LB(on), and LG(on), respectively, and guided to the projection lens 1009 in the direction perpendicular to the surface of the optical deflection array 300. Thus, lenses such as field lenses for guiding the reflected lights LR(on), LB(on), and LG(on) from the optical deflection array 300 to the projection lens 1009 are unnecessary. Accordingly, the optical system 1000 is reduced in size and capable of projecting a high-definition image.

The three light sources 1001, 1002, and 1003 used in the optical system 1000 may be LED (light-emitting diode) array light sources. Therefore, heat generated by the light sources 1001, 1002, and 1003 are reduced. Further, the light sources 1001, 1002, and 1003 are reduced in size and operated with reduced electricity. Furthermore, an air-cooling fan is not needed. Accordingly, the optical system 1000 can be reduced in size and be relatively low in electric consumption.

An LED array light source is formed by a plurality of LEDs placed two-dimensionally. If the plurality of LEDs are placed in an LED array, brightness of light is increased, but uniformity in the brightness within a surface of the LED array decreases. For example, brightness distribution between adjacent LEDs may differ from brightness distribution on the LEDs. In light of this, the light-shaping lenses 1004, 1005, and 1006 are provided between each of the three light sources 1001, 1002, and 1003 and the optical deflection array 300 along the light paths in the optical system 1000 to improve the brightness distribution in the LED array, to improve directivity of the lights LR, LB, and LG emitted from the light sources 1001, 1002, and 1003, and to shape the lights LR, LB, and LG into rectangular lights through aperture mechanism.

The above-described embodiments are illustrative, and numerous additional modifications and variations are possible in light of the above teachings. For example, elements and/or features of different illustrative and exemplary embodiments herein may be combined with each other and/or substituted for each other within the scope of this disclosure and appended claims. It is therefore to be understood that within the scope of the appended claims, the disclosure of this patent specification may be practiced otherwise than as specifically described herein.

The invention claimed is:

1. An optical deflection device comprising:
    a substrate;
    a plurality of regulating members respectively provided at a plurality of edge portions on an upper surface of the substrate, and respectively including upper portions including stoppers;
    a fulcrum member provided on the upper surface of the substrate, and including a top portion serving as an electrode configured to establish a potential thereof;
    a plate member movably placed in a space formed by the substrate, the fulcrum member, and the stoppers, the plate member comprising:
        unfixed edge portions;
        a light reflecting region forming an upper surface of the plate member; and
        a conductive layer electrically connected to the fulcrum member; and
    a plurality of electrodes provided on the upper surface of the substrate to be approximately opposite to the conductive layer of the plate member and to surround the fulcrum member,
    wherein, when at least a part of the plurality of electrodes are fixed to predetermined potentials and a potential of the fulcrum member is changed, the plate member tilts and displaces around the fulcrum member due to electrostatic attraction force, and a light incident in the light reflecting region in a first direction is deflected and reflected in a second direction different from the first direction.

2. The optical deflection device as described in claim 1, wherein potentials of the plurality of electrodes are fixed to at least two levels, and
    wherein the potential of the fulcrum member is switched between the at least two levels.

3. The optical deflection device as described in claim 1, wherein the plurality of electrodes are divided into first and second electrode groups with respect to the fulcrum member, and
    wherein, in a revolving movement of the plate member around the top portion of the fulcrum member, when the potential of the fulcrum member is at a first level, an electrostatic moment is greater between the first electrode group and the conductive layer than between the second electrode group and the conductive layer, and when the potential of the fulcrum member is at a second level, the electrostatic moment is greater between the second electrode group and the conductive layer than between the first electrode group and the conductive layer.

4. The optical deflection device as described in claim 3, wherein the fulcrum member includes at least one active element selected according to an address signal for changing a potential of the plate member.

5. The optical deflection device as described in claim 4, wherein the at least one active element is a static random access memory.

6. The optical deflection device as described in claim 5, wherein the plate member is displaced in any one of first and second optical deflection axial directions according to a combination of potentials applied to the plurality of electrodes.

7. The optical deflection device as described in claim 6, wherein the plurality of electrodes include four electrodes, and
    wherein the plate member is displaced in any one of the first and second optical deflection axial directions by changing potentials of the four electrodes and the potential of the conductive layer.

8. The optical deflection device as described in claim 7, wherein the four electrodes are approximately equal in area.

9. The optical deflection device as described in claim 7, wherein the four electrodes are placed to substantially face four corners of the plate member, respectively.

10. The optical deflection device as described in claim 7, wherein potentials of a pair of two mutually diagonal electrodes of the four electrodes are fixed to two respective predetermined levels.

11. The optical deflection device as described in claim 7, wherein potentials of a pair of two mutually diagonal electrodes of the four electrodes are switched between two levels.

12. The optical deflection device as described in claim 11, wherein the pair of two mutually diagonal electrodes of the four electrodes are respectively applied with mutually complementary potentials output from the static random access memory.

13. The optical deflection device as described in claim 12, wherein an address signal input in the static random access memory is the address signal input in the at least one active element.

14. The optical deflection device as described in claim 7, wherein potentials of a first pair of two mutually diagonal electrodes of the four electrodes are fixed to two respective predetermined levels, and wherein potentials of a second pair of the other two mutually diagonal electrodes of the four electrodes and the potential of the fulcrum member are concurrently switched between the two respective predetermined levels.

15. The optical deflection device as described in claim 7, further comprising first and second semiconductor memory devices, wherein a first pair of two electrodes of the four electrodes that are mutually diagonally across the fulcrum member are connected to respective external potential supply lines, wherein a second pair of the other two electrodes of the four electrodes that are mutually diagonally across the fulcrum member are connected to two mutually complementary potentials output from the first semiconductor memory device, and wherein the electrode of the fulcrum member is connected to an arbitrary potential output from the second semiconductor memory device.

16. The optical deflection device as described in claim 15, wherein the two mutually complementary potentials output from the first semiconductor memory device carry data determining an optical deflection axial direction in which an optical deflection operation is performed, and wherein the arbitrary potential output from the second semiconductor memory device carries data determining an optical deflection axial direction in which the plate member is tilted in an arbitrary optical deflection axial direction.

17. The optical deflection device as described in claim 16, wherein each of the first and second semiconductor memory devices is a static random access memory.

18. The optical deflection device as described in claim 5, wherein a number and a shape of the plurality of electrodes are symmetrical with respect to a diagonal of the plate member.

19. An optical deflection array comprising:

a plurality of optical deflection devices placed in either one of a one-dimensional array or a two-dimensional array, each of the plurality of optical deflection devices comprising:

a substrate;

a plurality of regulating members respectively provided at a plurality of edge portions on an upper surface of the substrate, and respectively including upper portions including stoppers;

a fulcrum member provided on the upper surface of the substrate, and including a top portion serving as an electrode configured to establish a potential thereof;

a plate member movably placed in a space formed by the substrate, the fulcrum member, and the stoppers, the plate member comprising:

unfixed edge portions;

a light reflecting region forming an upper surface of the plate member; and a conductive layer electrically connected to the fulcrum member; and a plurality of electrodes provided on the upper surface of the substrate to be approximately opposite to the conductive layer of the plate member and to surround the fulcrum member, wherein, when at least a part of the plurality of electrodes are fixed to predetermined potentials and a potential of the fulcrum member is changed, the plate member tilts and displaces around the fulcrum member due to electrostatic attraction force, and a light incident in the light reflecting region in a first direction is deflected and reflected in a second direction different from the first direction.

20. The optical deflection array as described in claim 19, wherein the optical deflection array is the two-dimensional array, wherein the plurality of electrodes include four electrodes, and wherein, when a first pair of two mutually diagonal electrodes of the four electrodes are fixed to predetermined potentials, a second pair of the other two mutually diagonal electrodes of the four electrodes are concurrently switched.

21. The optical deflection array as described in claim 20, wherein, within each of a plurality of the optical deflection devices forming a row of the optical deflection array, when the first pair of two mutually diagonal electrodes of the four electrodes are fixed to predetermined potentials, electrodes of a second pair of the other two mutually diagonal electrodes of the four electrodes are concurrently switched.

22. The optical deflection array as described in claim 21, wherein the plurality of the optical deflection devices forming the optical deflection array are divided into a plurality of rows and are separately driven according to the plurality of rows.

23. The optical deflection array as described in claim 19, further comprising two external potential supply lines, wherein the plurality of electrodes include four electrodes, and wherein, within a plurality of the optical deflection devices forming the entirety or a part of the optical deflection array, the two external potential supply lines are connected to a first pair of two electrodes of the four electrodes that are mutually diagonally across the fulcrum member.

24. An optical system for projecting an image, the optical system comprising:

an optical deflection array;

at least one light source configured to apply a light to the optical deflection array; and a projection lens configured to project the light reflected by the optical deflection array according to color data, the optical deflection array comprising:

a plurality of optical deflection devices placed in either one of a one-dimensional array or a two-dimensional array, each of the plurality of optical deflection devices comprising:

a substrate;

a plurality of regulating members respectively provided at a plurality of edge portions on an upper surface of the substrate, and respectively including upper portions including stoppers;

a fulcrum member provided on the upper surface of the substrate, and including a top portion serving as an electrode configured to establish a potential thereof;

a plate member movably placed in a space formed by the substrate, the fulcrum member, and the stoppers, the plate member comprising:

unfixed edge portions;

a light reflecting region forming an upper surface of the plate member; and a conductive layer electrically connected to the fulcrum member; and a plurality of electrodes provided on the upper surface of the substrate to be approximately opposite to the conductive layer of the plate member and to surround the fulcrum member, wherein, when at least a part of the plurality of electrodes are fixed to predetermined potentials and a potential of the fulcrum member is changed, the plate member tilts and displaces around the fulcrum member due to electrostatic attraction force, and a light incident in the light reflecting region in a first direction is deflected and reflected in a second direction different from the first direction.

25. The optical system as described in claim 24, further comprising a control chip, wherein the each of the plurality of optical deflection devices further comprises first and second semiconductor memory devices, wherein the control chip converts color data into first data determining an optical deflection axial direction, and second data determining an optical deflection axial direction in which the plate member is tilted in an arbitrary optical deflection axial direction, and wherein the control chip inputs the first and second data into the first and second semiconductor memory devices.

26. The optical system as described in claim 25, wherein three lights of respective three primary colors red, green, and blue are applied to each of the plurality of the optical deflection devices from three different directions, and wherein each of the three lights is reflected and guided to the projection lens for an arbitrary time according to color data.

27. The optical system as described in claim 26, wherein the three lights are reflected and guided to the projection lens in a direction perpendicular to a surface of the optical deflection array.

28. The optical system as described in claim 27, wherein the at least one light source is a light-emitting-diode array light source.

29. An image projection display apparatus comprising:
a screen; and
an optical system for projecting an image onto the screen, the optical system comprising:
an optical deflection array;
at least one light source configured to apply a light to the optical deflection array; and
a projection lens configured to project the light reflected by the optical deflection array according to color data, the optical deflection array comprising:
a plurality of optical deflection devices placed in either one of a one-dimensional array or a two-dimensional array, each of the plurality of optical deflection devices comprising:
a substrate;
a plurality of regulating members respectively provided at a plurality of edge portions on an upper surface of the substrate, and respectively including upper portions including stoppers;
a fulcrum member provided on the upper surface of the substrate, and including a top portion serving as an electrode configured to establish a potential thereof;
a plate member movably placed in a space formed by the substrate, the fulcrum member, and the stoppers, the plate member comprising:
unfixed edge portions;
a light reflecting region forming an upper surface of the plate member; and
a conductive layer electrically connected to the fulcrum member; and
a plurality of electrodes provided on the upper surface of the substrate to be approximately opposite to the conductive layer of the plate member and to surround the fulcrum member,
wherein, when at least a part of the plurality of electrodes are fixed to predetermined potentials and a potential of the fulcrum member is changed, the plate member tilts and displaces around the fulcrum member due to electrostatic attraction force, and a light incident in the light reflecting region in a first direction is deflected and reflected in a second direction different from the first direction.

* * * * *